(12) United States Patent  (10) Patent No.: US 12,548,446 B2
Allen et al.  (45) Date of Patent: Feb. 10, 2026

(54) COLLISION WARNING SYSTEM AND METHOD FOR A VEHICLE

(71) Applicant: Nissan North America, Inc., Franklin, TN (US)

(72) Inventors: John Tyler Allen, Northville, MI (US); Roy Goudy, Farmington Hills, MI (US); Neal Probert, Beverly Hills, MI (US); Jeremy Chambers, Casco, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 323 days.

(21) Appl. No.: 17/218,019

(22) Filed: Mar. 30, 2021

(65) Prior Publication Data

US 2022/0319324 A1 Oct. 6, 2022

(51) Int. Cl.
| | |
|---|---|
| *G06F 19/00* | (2018.01) |
| *G07C 5/04* | (2006.01) |
| *G08G 1/16* | (2006.01) |
| *B60Q 9/00* | (2006.01) |
| *G01S 19/51* | (2010.01) |

(52) U.S. Cl.
CPC ............. *G08G 1/161* (2013.01); *G07C 5/04* (2013.01); *G08G 1/166* (2013.01); *B60Q 9/008* (2013.01); *G01S 19/51* (2013.01)

(58) Field of Classification Search
CPC .......... G08G 1/161; G08G 1/166; G07C 5/04; B60Q 9/008; G01S 19/51
See application file for complete search history.

(56) References Cited

U.S. PATENT DOCUMENTS

| | | | |
|---|---|---|---|
| 10,032,379 B1 | 7/2018 | Chambers et al. | |
| 11,242,051 B1 * | 2/2022 | Konrardy | G08G 1/096725 |
| 2016/0071417 A1 * | 3/2016 | Lewis | G08G 1/162 |
| | | | 701/301 |
| 2016/0321924 A1 * | 11/2016 | Lewis | B60W 40/109 |
| 2018/0022351 A1 * | 1/2018 | Habu | B60W 30/12 |
| | | | 701/96 |
| 2018/0126976 A1 | 5/2018 | Naserian et al. | |
| 2019/0196025 A1 | 6/2019 | Al-Stouhi et al. | |
| 2022/0180750 A1 * | 6/2022 | Chen | G08G 1/166 |

* cited by examiner

*Primary Examiner* — Adam M Alharbi
(74) *Attorney, Agent, or Firm* — Spencer Fane, LLP

(57) ABSTRACT

A collision warning system for a host vehicle includes a wireless communication system and an electronic controller. The wireless communication system is configured to receive data transmissions from remote vehicles. The electronic controller is configured to receive data transmissions from a first remote vehicle. A travel path is determined based on positional information included in the received data transmissions from the first remote vehicle, and whether the host vehicle is on the travel path is determined. Whether the second remote vehicle is on the travel path of the host vehicle is determined based on data transmissions received from the second remote vehicle. Generation of a warning is prevented upon determining that the second remote vehicle is on the travel path of the host vehicle.

20 Claims, 16 Drawing Sheets

COLLISION WARNING SYSTEM AND METHOD FOR A VEHICLE

BACKGROUND

Field of the Invention

The present invention generally relates to a collision warning system and method for a vehicle. More specifically, the present invention relates to a collision warning system and method that defines a traveling path of a host vehicle based on data transmission from a first remote vehicle, and determines whether to generate a warning based on the traveling path and a heading of a second remote vehicle.

Background Information

Vehicles having a navigation system, such as a global positioning system, typically acquire and store road map data that the navigation system uses to generate a map display. Existing collision warning systems use the map data to determine a traveling path of a host vehicle. Vehicle to vehicle communication allows the host vehicle to receive positional information from a remote vehicle indicative of a heading of the remote vehicle. The collision warning system of the host vehicle determines whether to generate a collision warning based on a comparison of the traveling path of the host vehicle based on the map data of the navigation system and the received heading of the remote vehicle. A false collision warning can be generated by the collision warning system of the host vehicle, particularly when both the host vehicle and the remote vehicle are entering opposite ends of a curve.

SUMMARY

A need exists for a collision warning system and method that improves the accuracy of the collision warning system and method of a host vehicle. A further need exists for a collision warning system and method that determines whether to generate a warning without reliance on map data of a vehicle navigation system.

In view of the state of the known technology, one aspect of the present disclosure is to provide a collision warning system for a host vehicle including a wireless communication system and an electronic controller. The wireless communication system is configured to receive data transmissions from remote vehicles. Each data transmission includes an identification and current positional information of a transmitting remote vehicle. The electronic controller configured to receive data transmissions from a first remote vehicle. A travel path is determined based on positional information included in the received data transmissions from the first remote vehicle. Whether the host vehicle is on the travel path is determined. Data transmissions are received from a second remote vehicle. Whether the second remote vehicle is on the travel path is determined. Generation of a warning is prevented upon determining that the second remote vehicle is on the travel path of the host vehicle. Whether the host vehicle and the second remote are on an intersecting path is determined upon determining that the second remote vehicle is not on the travel path of the host vehicle. A warning is generated upon determining that the host vehicle and the second remote vehicle are on the intersecting path.

Another aspect of the present invention is to provide a collision warning method for a host vehicle. A data transmission is received from a first remote vehicle. The data transmission of the first remote vehicle includes an identification of the first remote vehicle and current positional information of the first remote vehicle. A travel path of the first remote vehicle is determined based on the received positional information from the first remote vehicle. Whether the host vehicle is on the travel path is determined. The travel path of the first remote vehicle is set as the travel path of the host vehicle upon determining the host vehicle to be on the travel path of the first remote vehicle. A data transmission is received from a second remote vehicle. The data transmission of the second remote vehicle includes an identification of the second remote vehicle and current positional information of the second remote vehicle. Whether the second remote vehicle is on the travel path of the host vehicle is determined. Generation of a warning is prevented upon determining that the second remote vehicle is on the travel path of the host vehicle. Whether the host vehicle and the second remote vehicle are on an intersecting path is determined. The warning is generated upon determining that the host vehicle and the second remote vehicle are on the intersecting path.

Also other objects, features, aspects and advantages of the disclosed collision warning system and method will become apparent to those skilled in the art from the following detailed description, which, taken in conjunction with the annexed drawings, discloses exemplary embodiments of the collision warning system and method.

BRIEF DESCRIPTION OF THE DRAWINGS

Referring now to the attached drawings which form a part of this original disclosure.

DETAILED DESCRIPTION OF EXEMPLARY EMBODIMENTS

Selected exemplary embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
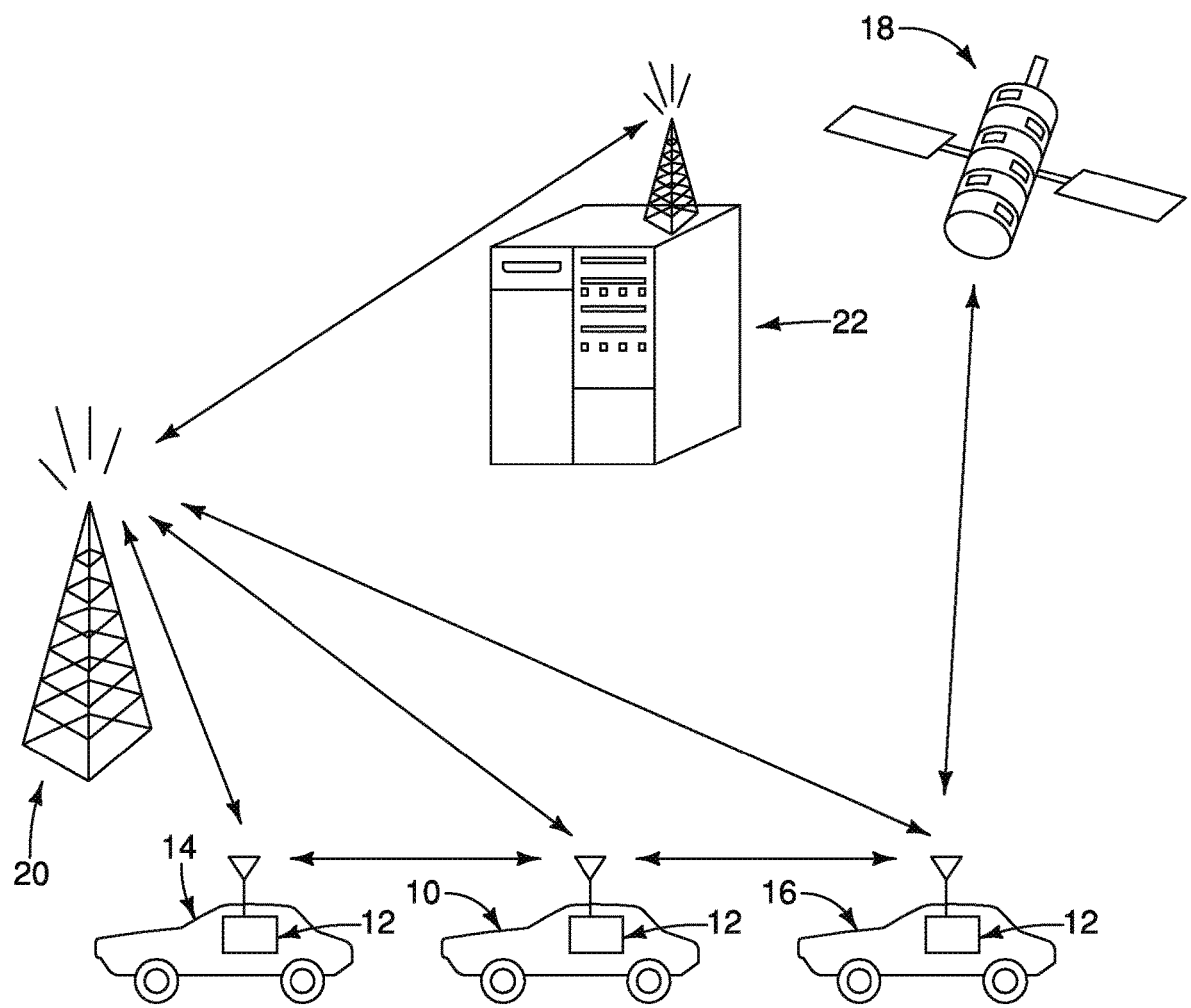
FIG. 1 is a schematic diagram illustrating a host vehicle equipped with a collision warning system in accordance with an exemplary embodiment of the present invention relative to remove vehicles.

Referring initially to FIG. 1, a two-way wireless communications network is illustrated that includes vehicle to vehicle communication and vehicle to base station communication. In FIG. 1, a host vehicle (HV) 10 is illustrated that is equipped with a collision warning system 12 according to an exemplary embodiment of the present invention, and two remote vehicles 14 and 16 that also includes the collision warning system 12. The first remote vehicle (RV1) can also be referred to as a path defining vehicle. The second remote vehicle (RV2) 16 can also be referred to as a possible or potential threat vehicle (PTV). While the host vehicle (HV) 10 and the remote vehicles 14 and 16 are illustrated as having the same collision warning system 12, it will be apparent from this disclosure that each of the first and second remote vehicles 14 and 16 is not required to have the collision warning system. The two-way communication system is capable of communicating remote vehicle information representing a travel condition of the respective remote vehicle 14 and 16 to the host vehicle 10. The remote vehicle information can include, for example, information representing the location (e.g., GPS location), speed, acceleration, heading and steering wheel angle of the respective remote vehicle 14 and 16 at each of a plurality of locations of the respective remote vehicle 14 and 16, and any other type of information suitable for representing positional information of the respective remote vehicle 14 and 16. Likewise, the host vehicle 10 can also exchange host vehicle information with each of the respective remote vehicles 14 and 16. The host vehicle information can include, for example, information representing the location (e.g., GPS location), speed, acceleration, heading, and steering wheel angle of the host vehicle 10 at each of a plurality of locations of the host vehicle 10, and any other type of information suitable for representing positional information of the host vehicle 10. The host vehicle 10 and the respective first and second remote vehicles 14 and 16 can exchange this type of host vehicle information and remote vehicle information with each other several times per second, or at any suitable time intervals.

An exemplary type of vehicle to vehicle communication is a basic safety message (BSM), which is configured to be broadcast by a vehicle. The BSM is received by another vehicle within a predetermined distance of the transmitting vehicle. The BSM is a packet of data that includes information about the position, heading, speed, identification, steering wheel angle, and other information relating to positional information of the transmitting vehicle. The BSM is transmitted by the transmitting vehicle at a predetermined frequency. The BSM transmitted by the transmitting vehicle is received by a wireless communication system of any receiving vehicle within the predetermined distance of the transmitting vehicle.

The collision warning system 12 of the host vehicle 10 and the first and second remote vehicles 14 and 16 communicate with the two-way wireless communications network. As shown in FIG. 1, for example, the two-way wireless communications network can include one or more global positioning satellites 18 (only one shown), and one or more roadside (terrestrial) units 20 (only one shown), and a base station or external server 22. The global positioning satellites 18 and the roadside units 20 send and receive signals to and from the collision warning system 12 of the host vehicle 10 and the first and second remote vehicles 14 and 16. The base station 22 sends and receives signals to and from the collision warning system 12 of the host vehicle 10 and the first and second remote vehicles 14 and 16 via a network of the roadside units 20, or any other suitable two-way wireless communications network.

Figure 2:
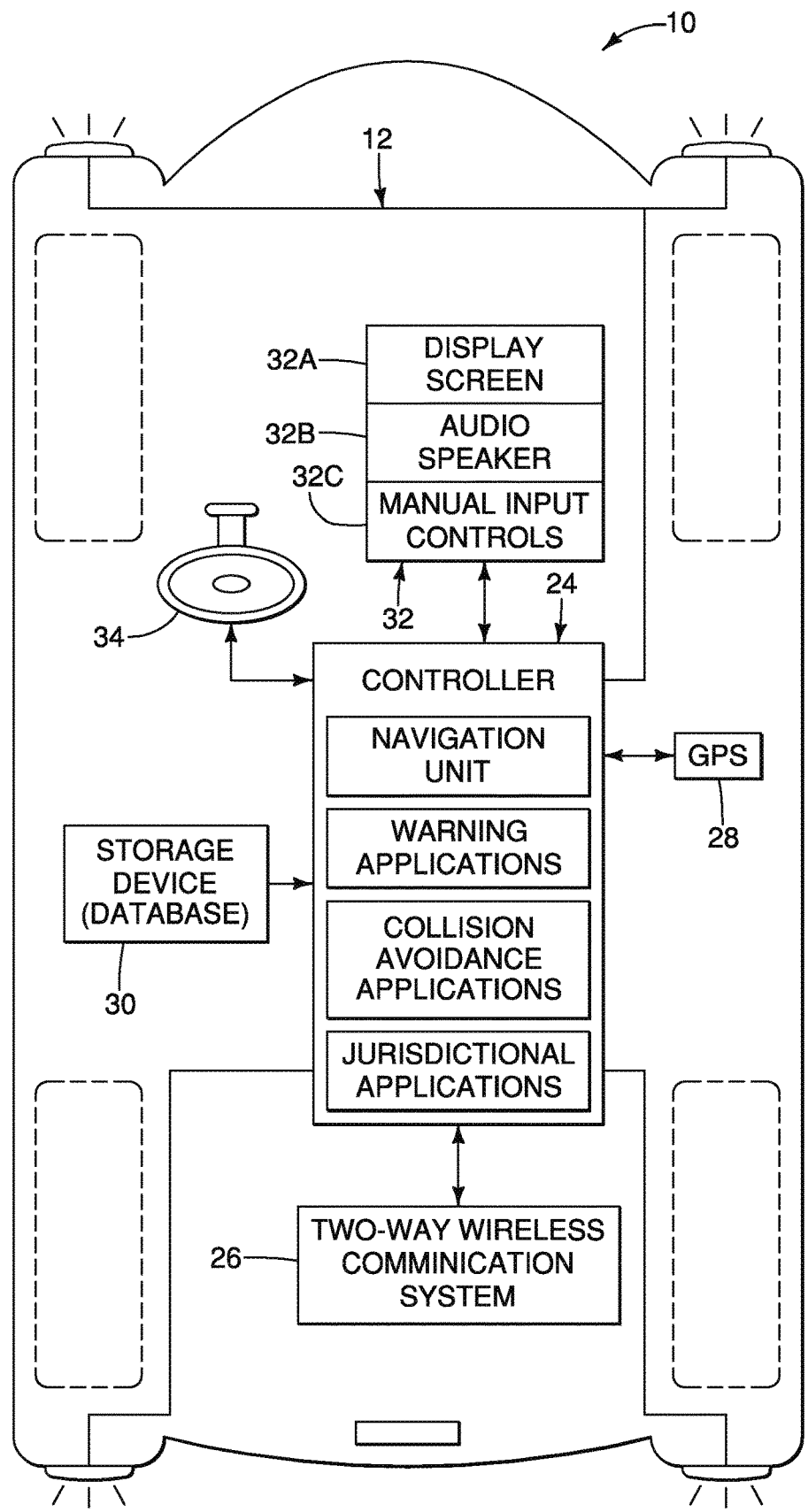
FIG. 2 is a block diagram of components of the host vehicle of FIG. 1.

As shown in more detail in FIG. 2, the collision warning system 12 includes an application controller 24 that can be referred to simply as an electronic controller or controller 22. The electronic controller 24 preferably includes a microcomputer with a control program that controls the components of the collision warning system 12 as discussed below. The electronic controller 24 includes other conventional components such as an input interface circuit, an output interface circuit, and storage devices such as a ROM (Read Only Memory) device and a RAM (Random Access Memory) device. The microcomputer of the controller 24 is at least programmed to control the collision warning system 12 in accordance with the flow chart of FIG. 4 as discussed below. It will be apparent to those skilled in the art from this disclosure that the precise structure and algorithms for the controller 24 can be any combination of hardware and software that will carry out the functions of the present invention. Furthermore, the controller 24 can communicate with the other components of the collision warning system 12 discussed herein via, for example a controller area network (CAN) bus or in any other suitable manner as understood in the art.

As shown in more detail in FIG. 2, the collision warning system 12 can further include a wireless communication system 26, a global positioning system (GPS) 28, a storage device 30, and a human-machine interface unit 32. The wireless communication system 26 can include, for example, a transmitter, a receiver, a transceiver, and any other suitable type of equipment as understood in the art. The human-machine interface unit 34 includes a screen display 34A, an audio speaker 34B and various manual input controls 34C that are operatively coupled to the controller 24. The screen display 34A and the audio speaker 34B are examples of interior warning devices of a warning system that are used to alert a driver. Of course, it will be apparent to those skilled in the art from this disclosure that interior warning devices include anyone of or a combination of visual, audio and/or tactile warnings as understood in the art that can be perceived inside the host vehicle 10. The host vehicle 10 also includes a steering wheel 34 to which a tactile warning can be transmitted as a warning device.

The wireless communications system 26 can include an omni-directional antenna and a multi-directional antenna, as well as communication interface circuitry that connects and exchanges information with a plurality of the remote vehicles 14 and 16 that are similarly equipped, as well as with the roadside units 22 through at least a portion of the wireless communications network within the broadcast range of the host vehicle 10. For example, the wireless communications system 26 can be configured and arranged to conduct direct two-way communications between the host and remote vehicles 10 and 14 and 16 (vehicle-to-vehicle communications) and the roadside units 20 (roadside-to-vehicle communications). Moreover, the wireless communications system 26 can be configured to periodically broadcast a signal in the broadcast area. The wireless communication system 26 can be any suitable type of two-way communication device that is capable of communicating with the remote vehicles 14 and 16 and the two-way wireless communications network. In this example, the wireless communication system 26 can include or be coupled to a dedicated short range communications (DSRC) antenna to receive, for example, 5.9 GHz DSRC signals from the two-way wireless communications network. These DSRC signals can include basic safety messages (BSM) defined by current industry recognized standards that include information which, under certain circumstances, can be analyzed to warn drivers of a potential problem situation or threat in time for the driver of the host vehicle 10 to take appropriate action to avoid the situation. For instance, the DSRC signals can also include information pertaining to weather conditions, adverse driving conditions and so on. In the disclosed embodiments, a BSM includes information in accordance with SAE Standard J2735 as can be appreciated by one skilled in the art. Also, the wireless communication system 26 and the GPS 28 can be configured as a dual frequency DSRC and GPS devices as understood in the art.

The GPS 28 can be a conventional global positioning system that is configured and arranged to receive global positioning information of the host vehicle 10 in a conventional manner. Basically, the global positioning system 28 receives GPS signals from the global positioning satellite 18 at regular intervals (e.g. one second) to detect the present position of the host vehicle 10. The GPS 28 has an accuracy in accordance with industry standards and thus, can indicate the actual vehicle position of the host vehicle 10 within a few meters or less (e.g., 10 meters less). The data representing the present position of the host vehicle 10 is provided to the controller 24 for processing as discussed herein. For example, the controller 24 can include or be coupled to navigation system components that are configured and arranged to process the GPS information in a conventional manner as understood in the art.

The storage device 30 can store the remote vehicle information as discussed above, such as positional information of the remote vehicle and identification of the remote vehicle. The storage device 30 can include, for example, a large-capacity storage medium such as a CD-ROM (Compact Disk-Read Only Memory) or IC (Integrated Circuit) card. The storage device 30 permits a read-out operation of reading out data held in the large-capacity storage medium in response to an instruction from the controller 26 to, for example, acquire the vehicle information as needed or desired for use in representing the location of the host vehicle 10, the remote vehicles 14 and 16, as understood in the art. The information in the storage device 30 can also be updated by the controller 24 or in any suitable manner as discussed herein and as understood in the art.

Figure 3:
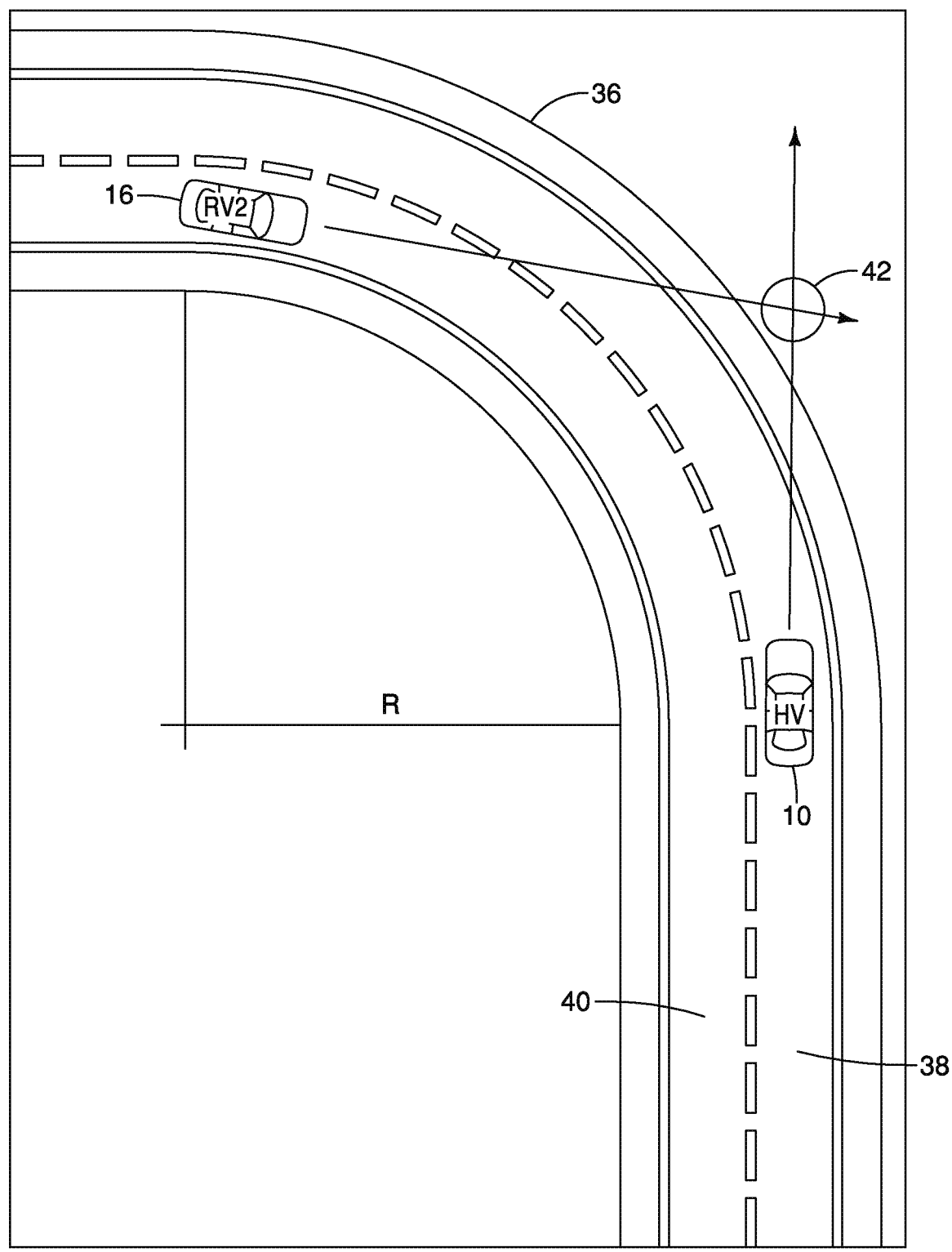
FIG. 3 is a diagrammatic view illustrating a second remote vehicle determined not to be on a traveling path of a host vehicle in accordance with an exemplary embodiment of the present invention.

Examples of operations performed by the collision warning system 12 will now be discussed with reference to FIGS. 3 to 26. As can be appreciated from the following description, because the host vehicle 10 and the first and second remote vehicles 14 and 16 are equipped with vehicle to vehicle communication technology as discussed above, the host vehicle 10 can use the remote vehicle information received from other similarly equipped remote vehicles to determine a traveling path without need for map data from the navigation system of the host vehicle, which can provide improved accuracy of the collision warning system 12, a significant cost savings and prevention of nuisance warnings. Also, in view of pending NHTSA regulations that would require vehicle to vehicle communication technology in new vehicles in the future, the collision warning system 12 according to the exemplary embodiments of the present invention can significantly enhance the functionality of crash warning systems that leverage information received via vehicle to vehicle communication from other vehicles to either suppress warnings that are not necessary, such as shown in FIG. 3, or issue warnings under circumstances that other sensor-based systems could not detect. For instance, by using GPS position and heading information received from the first and second remote vehicles 14 and 16, the collision warning system 12 according to the exemplary embodiments provides an accurate identification of the traveling path of the host vehicle 10 and of an approaching remote vehicle 16. This information can be used to suppress unnecessary warnings that could otherwise be a nuisance, such as shown in FIG. 3. The collision warning system 12 can also be beneficial with regard to compliance with Federal Motor Vehicle Safety Standards (FMVSS) and New Car Assessment Program (NCAP) requirements.

Figure 4:
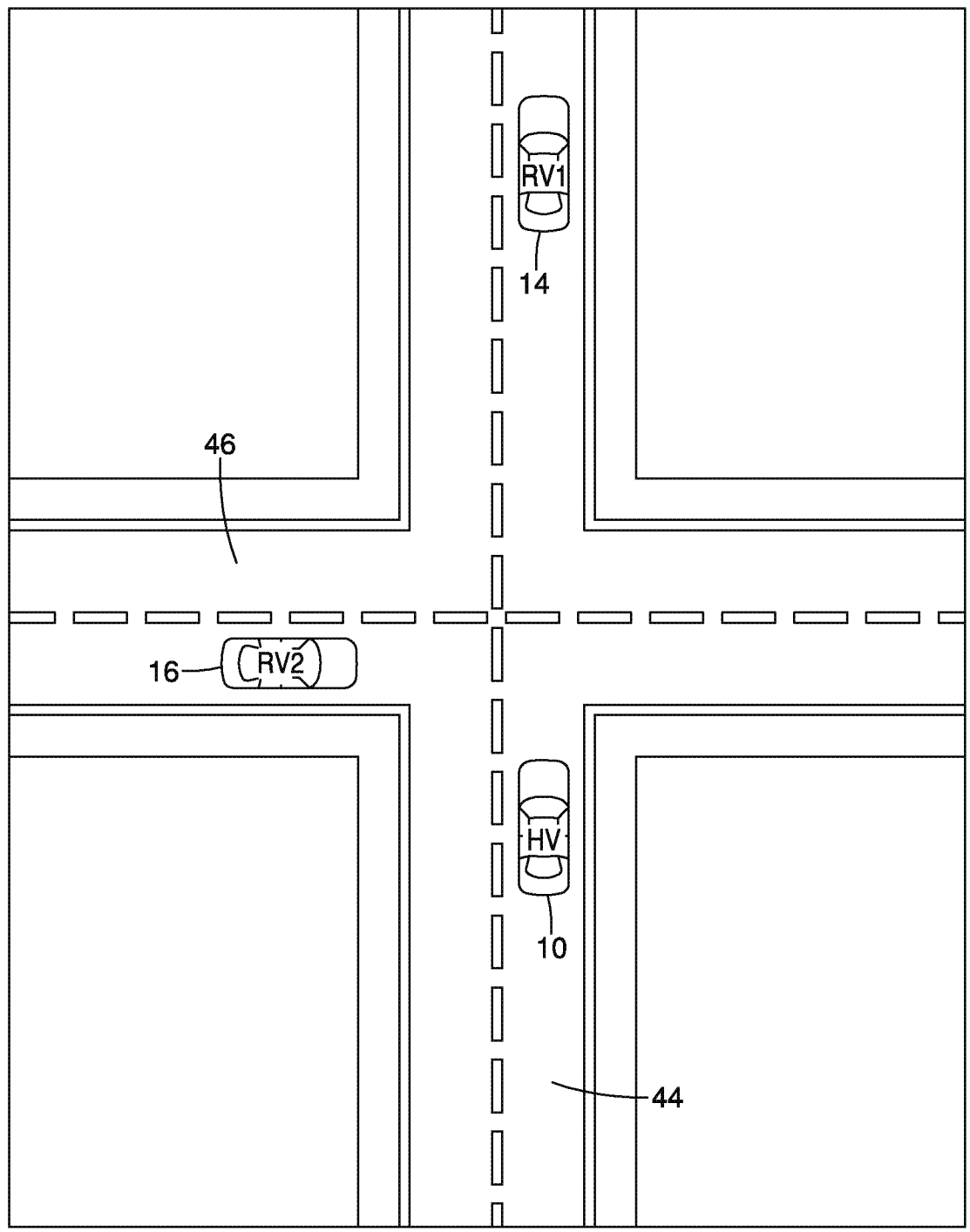
FIG. 4 is a diagrammatic view illustrating a second remote vehicle determined to be on an intersecting path with the host vehicle in accordance with an exemplary embodiment of the present invention.

FIG. 4 is a flowchart illustrating an example of operations performed by the collision warning system 12 to determine whether a warning should be issued due to a crossing, or intersecting, path being detected between the host vehicle 10 and the second remote vehicle 16. A map of the road geometry in a proximity of the host vehicle 10 is generated based on current positional information received from the first remote vehicle 14. Using this developed map, the host vehicle 10 then determines whether a crossing, or intersecting, path exists with the second remote vehicle 16. The collision warning system 12 of the exemplary embodiment of the present invention prevents, or suppresses, warnings that would otherwise be interpreted as a crossing path due to the road geometry based on the existing map data of the navigation system of the host vehicle 10, as shown in FIG. 3. As described below, the collision warning system 12 prevents, or suppresses, a warning from being issued when the second remote vehicle is determined to be on the travel path of the host vehicle 10.

Figure 11:
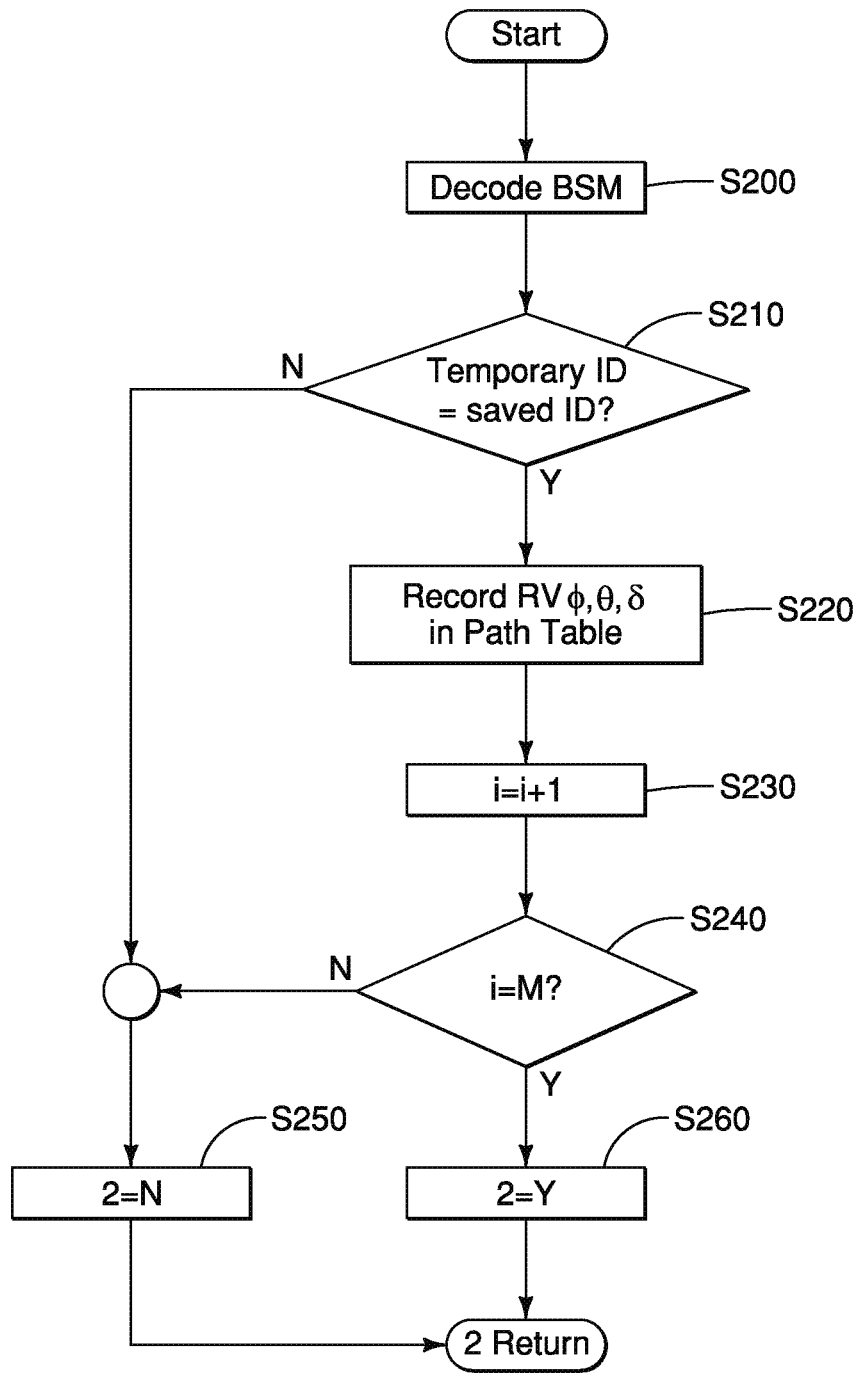
FIG. 11 is a flowchart illustrating a process of determining a path of a first remote vehicle during operation of the flowchart of FIG. 5.

The collision warning system 12 receives a data transmission from the first remote vehicle 14. The data transmission includes first remote vehicle information from the first remote vehicle 14. As discussed above, the first remote vehicle information includes current positional information and identification of the first remote vehicle 14. The current positional information includes, for example, vehicle position in latitude and longitude, elevation, heading, speed, acceleration, steering wheel angle, and any other type of information suitable for representing a first travel path of the first remote vehicle 14. The first remote vehicle 14 can transmit the first remote vehicle information several times per second, or at any suitable time intervals. The host vehicle 10 uses the first vehicle remote information received from the first remote vehicle 14 to develop a map of the road geometry in proximity to the host vehicle 10, as shown in FIGS. 2 and 11. The developed map is based on positional information of the first remote vehicle, and without reliance on existing map data of the navigation system of the host vehicle 10.

Figure 5:
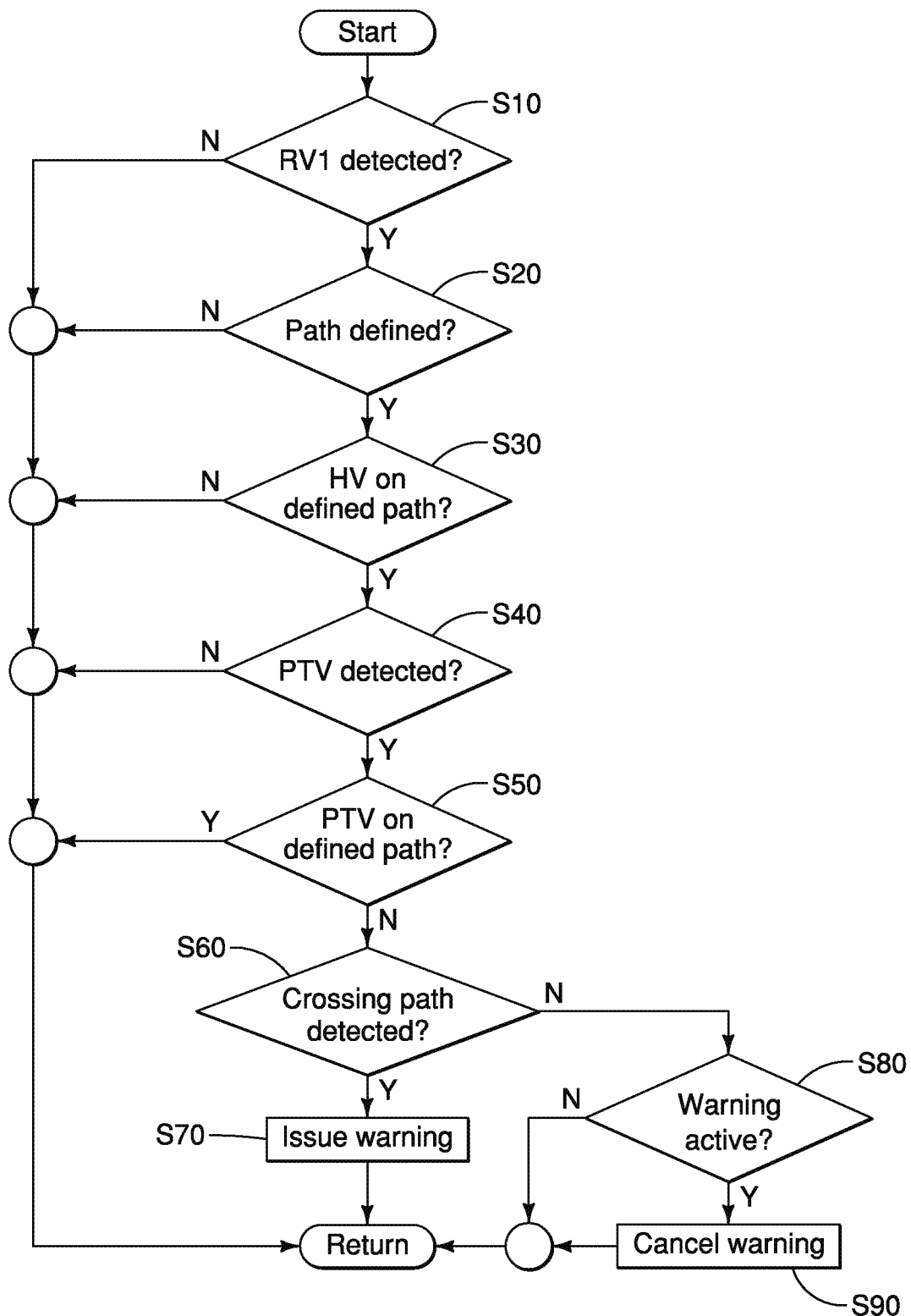
FIG. 5 is a flowchart illustrating a process of generating of a collision warning in accordance with an exemplary embodiment of the present invention.

As shown in the flowchart of FIG. 5, the host vehicle (HV) 10 uses information gathered from appropriate remote vehicles, such as the first remote vehicle (RV1) 14, to develop a map of the road geometry in proximity of the host vehicle 10, as shown in FIG. 3. By using this map, the host vehicle 10 can determine whether the second remote vehicle (RV2) 16 is on the travel path of the host vehicle 10 and whether the host vehicle 10 and the second remote vehicle 16 are on a crossing path. The collision warning system 12 (FIG. 2) on board the host vehicle 10 prevents, or suppresses, warnings that otherwise would be interpreted as a crossing path based on the road geometry of the existing map data, thereby generating a false collision warning.

Figure 12:
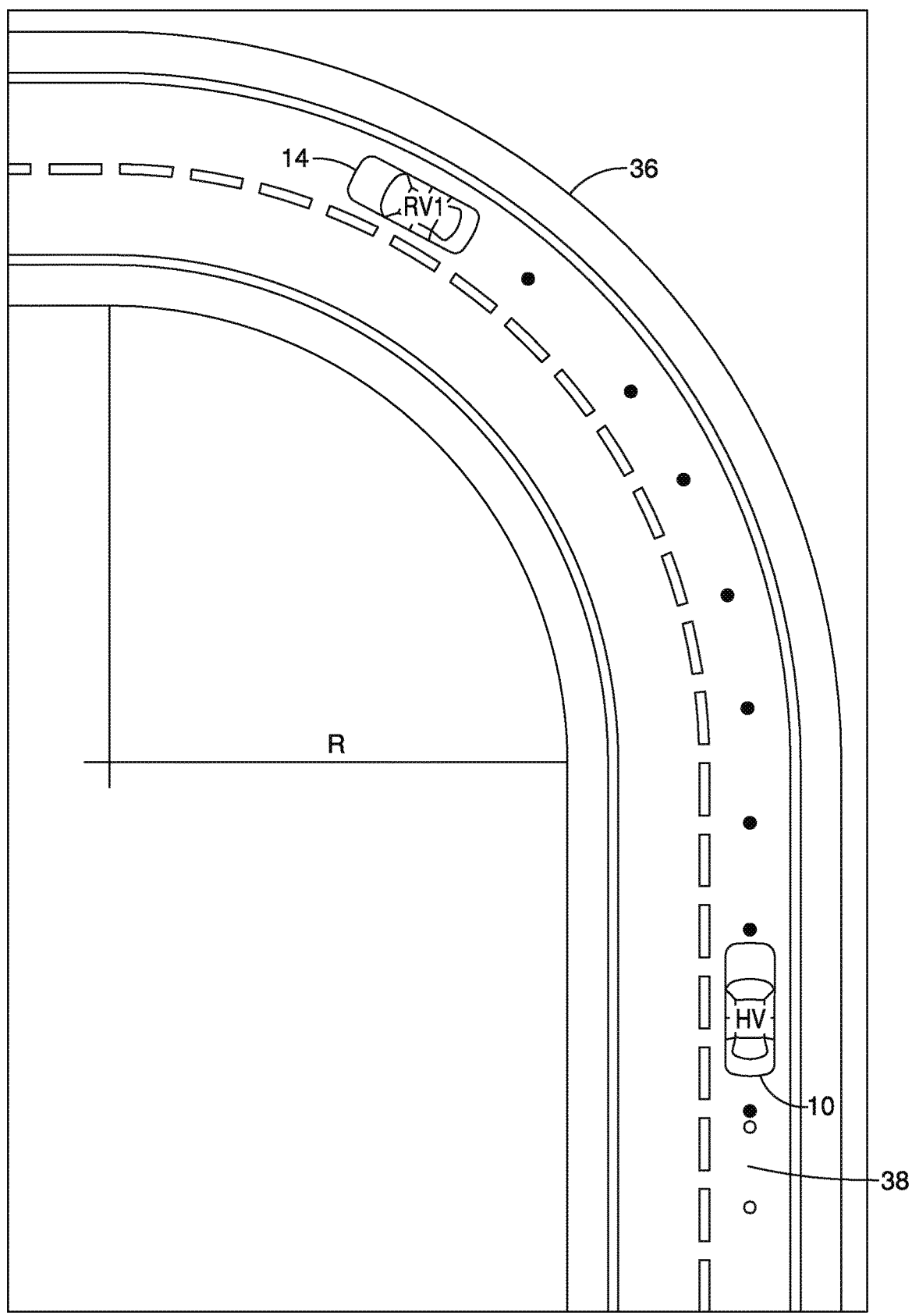
FIG. 12 is a diagrammatic view illustrating a process of defining a path of the first remote vehicle during operation of the flowchart of FIG. 11.

In step S10, the presence of a first remote vehicle (RV1) 14 is determined. The first remote vehicle 14 must be capable of transmitting vehicle dynamics information, such as in a basic safety message (BSM), transmitted through a vehicle-to-vehicle communication system, and be in the proximity of the host vehicle 10, as shown in FIG. 12. When the first remote vehicle 14 is detected, the process proceeds to step S20. When the first remote vehicle 14 is not detected, the process ends. The collision warning system 12 (FIG. 2) of the host vehicle 10 determines the presence of the first remote vehicle 14 in the remote vehicle detection process illustrated in the flowchart of FIG. 6.

As discussed above, the host vehicle 10 can transmit and receive data transmissions to and from a remote vehicle, such as the first remote vehicle 14 and the second remote vehicle 16. The vehicle information of the data transmission can include, for example, information representing the location (e.g., GPS location), speed, acceleration, heading, and steering wheel angle of the transmitting vehicle at each of a plurality of locations of the transmitting vehicle, and any other type of information suitable for representing positional information of the transmitting vehicle. The host vehicle 10 and the remote vehicles 14 and 16 can exchange this type of vehicle information with each other several times per second, or at any suitable time intervals.

Figure 6:
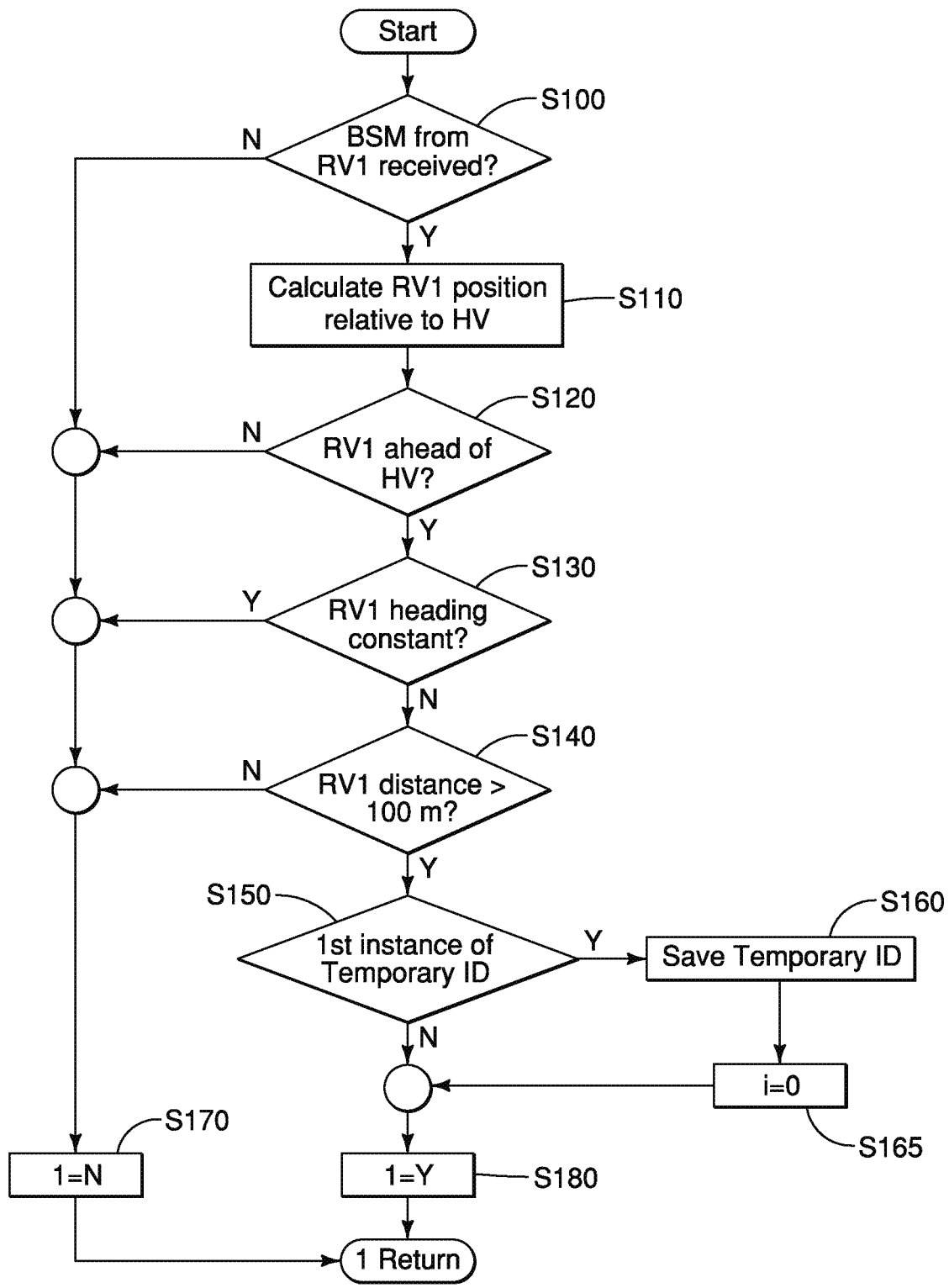
FIG. 6 is a flowchart illustrating a process of detecting a first remote vehicle during operation of the flowchart of FIG. 4.

The vehicle detection process illustrated in the flowchart of FIG. 6 begins with determining whether vehicle dynamics information of a basic safety message (BSM) is received from the first remote vehicle 14 (FIG. 12) by the host vehicle 10. When the collision warning system 12 (FIG. 2) receives the BSM from the first remote vehicle 14 in step S100, the process proceeds to step S110 in which the position of the first remote vehicle 14 relative to the host vehicle is calculated. When a basic safety message is not received from the first remote vehicle 14 in step S100, the process moves to step S170 in which a no decision (RV1 not detected) is returned to the step S10 of the flowchart of FIG. 5.

Based on the position of the first remote vehicle 14 calculated in step S110, the collision warning system 12 then determines whether the first remote vehicle 14 is ahead of the host vehicle 10 in step S120. As shown in FIG. 12, the first remote vehicle 14 is ahead of the host vehicle 10. In other words, the first remote vehicle is in a position ahead of the host vehicle 10 in a direction in which the host vehicle 10 is traveling. When the position of the first remote vehicle 14 is determined to not be ahead of the host vehicle 10, the process moves to step S170 in which a no decision (RV1 not detected) is returned to the step S10 of the flowchart of FIG. 5.

The collision warning system 12 (FIG. 2) can define a series of mathematical expressions that provide specific information regarding the longitudinal, lateral, elevation and heading of the first remote vehicle 14 relative to the host vehicle 10. These equations are used to determine the position of the first remote vehicle 14 relative to the host vehicle 10 and to determine whether the first remote vehicle is ahead of the host vehicle 10 in steps S110 and S120 of FIG. 6.

The following exemplary equation is used to determine the longitudinal and lateral position of the first remote vehicle 14 relative to the host vehicle 10. Using the coordinates of north, south, east and west with the host vehicle 10 being at the center for the purposes of these examples and equations, the processing performed by the controller 24 divides the area surrounding the host vehicle 10 into quadrants Q1 (northeast), Q2 (northwest), Q3 (southwest) and Q4 (southeast) as will now be described with reference to FIGS. 7-10. By performing these operations, the controller 24 is effectively identifying sections of a curved road 36 on which the host vehicle 10 is traveling, because depending upon the location of the host vehicle 10, at least some of the quadrants Q1, Q2, Q3 and Q4 can overlap with at least a portion of the curved road.

Figure 7:
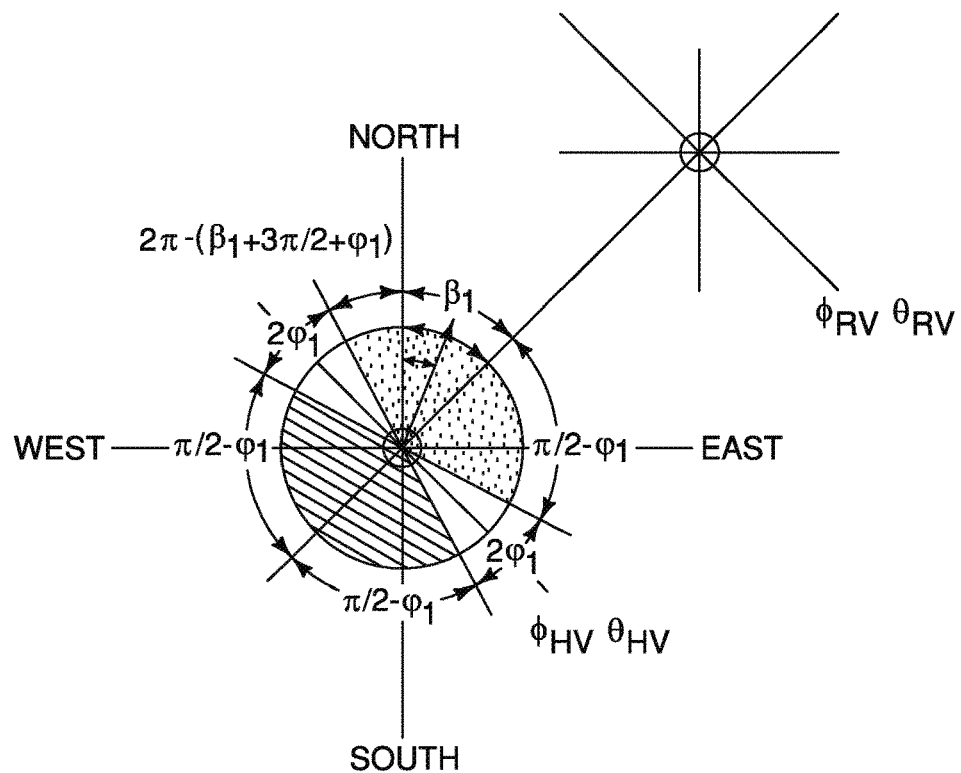
FIG. 7 is a graphical representation of a first remote vehicle located to the northeast of the host vehicle as used in calculations performed by the collision warning system during the operation of the flowchart of FIG. 5.

FIG. 7 illustrates a condition in which the first remote vehicle 14 is in quadrant Q1 to the northeast of the host vehicle 10.

$$Q_1 = \frac{1}{4}\left[\frac{\phi_{RV} - \phi_{HV} - \sigma}{|\phi_{RV} - \phi_{HV}| + \sigma} + 1\right] \times \left[\frac{\theta_{RV} - \theta_{HV} + \sigma}{|\theta_{RV} - \theta_{HV}| + \sigma} + 1\right]$$

When the first remote vehicle 14 is northeast of the host vehicle 10, as shown in FIG. 7, both the latitude and longitude of the first remote vehicle is greater than the latitude and longitude for the host vehicle. Under these conditions, the expression for $Q_1$ above will equal 1, otherwise it will equal 0.

The first remote vehicle 14 is determined to be ahead of the host vehicle 10 in step S120 of FIG. 6 when one of the following equations is satisfied:

$$0 \le \delta_{HV} < A_1 \text{ or } A_2 \le \delta_{HV} < 2\pi$$

$$\text{where } A_1 = \beta_1 + \frac{\pi}{2} - \varphi_1, \text{ and } A_2 = \beta_1 + \frac{3\pi}{2} + \varphi_1.$$

$\varphi_1$ is a threshold value that defines the angular range in which the first remote vehicle 14 is defined to be adjacent to the host vehicle 10.

$$\beta_1 = \pi\left[\frac{\theta_{HV} - \theta_{RV} - \sigma}{|\theta_{HV} - \theta_{RV}| + \sigma} + 1\right] -$$

-continued $$\cos^{-1}\left(\frac{\phi_{RV} - \phi_{HV}}{\sqrt{(\theta_{RV} - \theta_{HV})^2 \cos^2 \phi_{HV} + (\phi_{RV} - \phi_{HV})^2}}\right)\left[\frac{\theta_{HV} - \theta_{RV} - \sigma}{|\theta_{HV} - \theta_{RV}| + \sigma}\right]$$

This region is identified as the dotted area in FIG. 7. These conditions can be defined in one mathematical expression as:

$$P_{Q_1} = \frac{1}{4}\left[\frac{\delta_{HV} - 0 + \sigma}{|\delta_{HV} - 0| + \sigma} + 1\right] \times \left[\frac{A_1 - \delta_{HV} - \sigma}{|A_1 - \delta_{HV}| + \sigma} + 1\right] + \frac{1}{4}\left[\frac{\delta_{HV} - A_4 + \sigma}{|\delta_{HV} - A_4| + \sigma} + 1\right] \times \left[\frac{2\pi - \delta_{HV} - \sigma}{|2\pi - \delta_{HV}| + \sigma} + 1\right]$$

Figure 8:
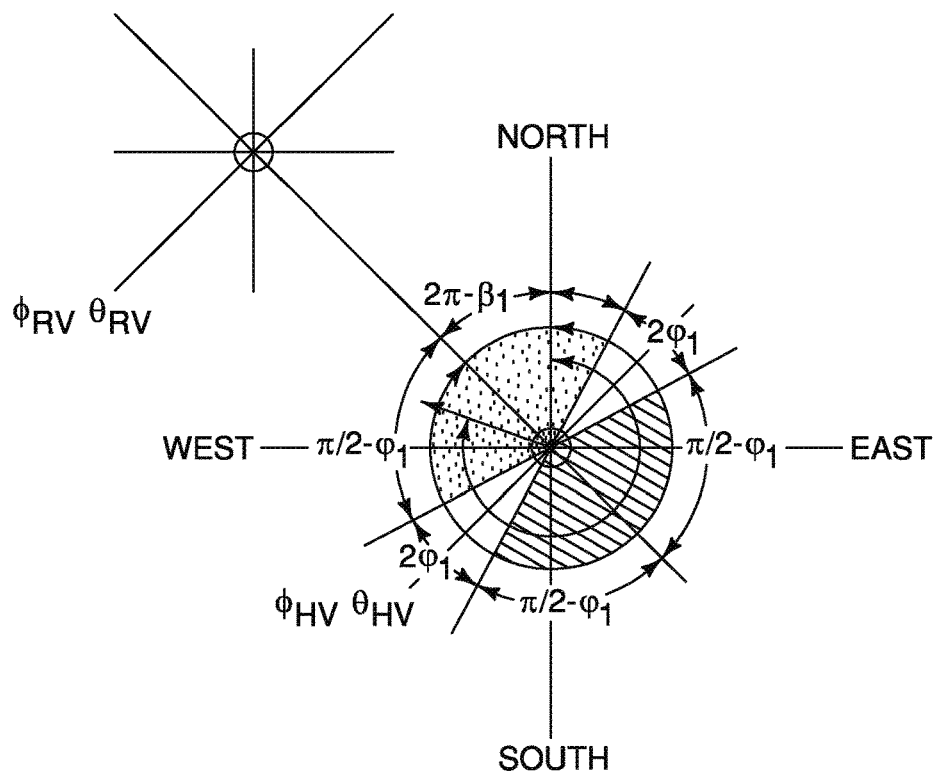
FIG. 8 is a graphical representation of a first remote vehicle located to the northwest of the host vehicle as used in calculations performed by the collision warning system during the operation of the flowchart of FIG. 5.

FIG. 8 illustrates a condition in which the first remote vehicle 14 is in quadrant Q2 to the northwest of the host vehicle 10.

$$Q_2 = \frac{1}{4}\left[\frac{\phi_{RV} - \phi_{HV} + \sigma}{|\phi_{RV} - \phi_{HV}| + \sigma} + 1\right] \times \left[\frac{\theta_{HV} - \theta_{RV} - \sigma}{|\theta_{HV} - \theta_{RV}| + \sigma} + 1\right]$$

When the first remote vehicle 14 is northwest of the host vehicle 10, as shown in FIG. 8, the latitude of the first remote vehicle 14 is greater than the latitude of the host vehicle 10, but the longitude of the first remote vehicle 14 is less than the longitude for the host vehicle 10. Under these conditions, the expression for $Q_2$ above will equal 1, otherwise it will equal 0.

The first remote vehicle 14 is determined to be ahead of the host vehicle 10 in step S120 of FIG. 6 when one of the following equations is satisfied:

$$0 \le \delta_{HV} < A_9 \text{ or } A_{12} \le \delta_{HV} < 2\pi$$

where $A_9 = \beta_1 - \frac{3\pi}{2} - \varphi_1$, and $A_{12} = \beta_1 - \frac{\pi}{2} + \varphi_1$.

This region is identified as the dotted area in FIG. 8. These conditions can be defined in one mathematical expression as:

$$P_{Q_2} = \frac{1}{4}\left[\frac{\delta_{HV} - 0 + \sigma}{|\delta_{HV} - 0| + \sigma} + 1\right] \times \left[\frac{A_9 - \delta_{HV} - \sigma}{|A_9 - \delta_{HV}| + \sigma} + 1\right] + \frac{1}{4}\left[\frac{\delta_{HV} - A_{12} + \sigma}{|\delta_{HV} - A_{12}| + \sigma} + 1\right] \times \left[\frac{2\pi - \delta_{HV} - \sigma}{|2\pi - \delta_{HV}| + \sigma} + 1\right]$$

Figure 9:
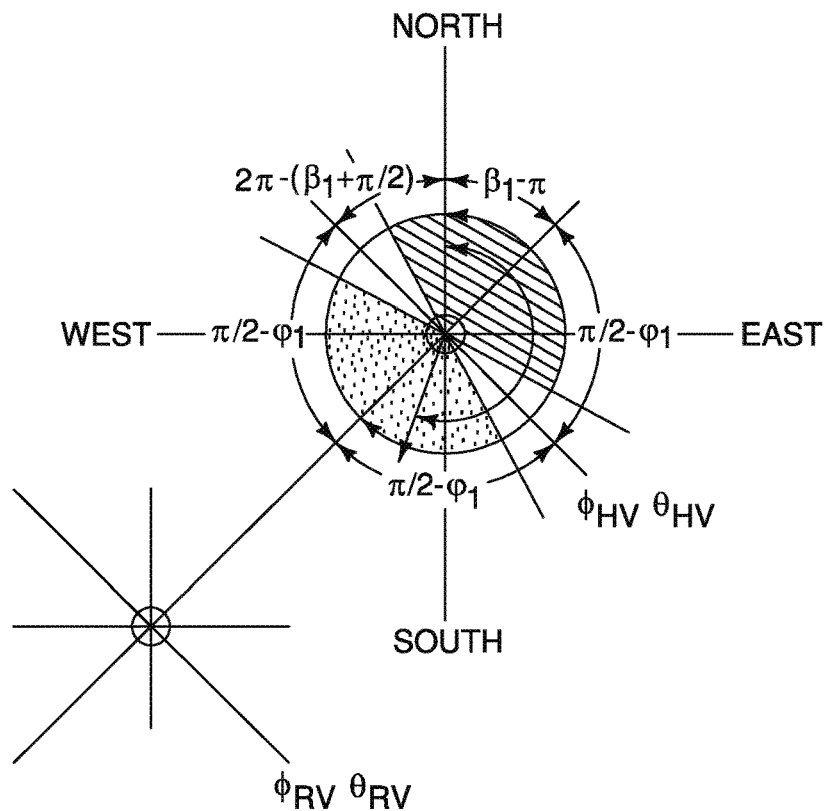
FIG. 9 is a graphical representation of a first remote vehicle located to the southwest of the host vehicle as used in calculations performed by the collision warning system during the operation of the flowchart of FIG. 5.

FIG. 9 illustrates a condition in which the first remote vehicle 14 is in quadrant Q3 to the southwest of the host vehicle 10.

$$Q_3 = \frac{1}{4}\left[\frac{\phi_{HV} - \phi_{RV} - \sigma}{|\phi_{HV} - \phi_{RV}| + \sigma} + 1\right] \times \left[\frac{\theta_{HV} - \theta_{RV} + \sigma}{|\theta_{HV} - \theta_{RV}| + \sigma} + 1\right]$$

When the first remote vehicle 14 is southwest of the host vehicle 10, as shown in FIG. 9, both the latitude and longitude of the first remote vehicle 14 is less than the latitude and longitude of the host vehicle 10. Under these conditions, the expression for $Q_3$ above will equal 1, otherwise it will equal 0.

The first remote vehicle 14 is determined to be ahead of the host vehicle 10 in step S120 of FIG. 6 when the following equation is satisfied:

$$A_{12} \le \delta_{HV} < A_1$$

where $A_1 = \beta_1 + \frac{\pi}{2} - \varphi_1$, and $A_{12} = \beta_1 - \frac{\pi}{2} + \varphi_1$.

This region is identified as the dotted area in FIG. 9. These conditions can be defined in one mathematical expression as:

$$P_{Q_3} = \frac{1}{4}\left[\frac{\delta_{HV} - A_{12} + \sigma}{|\delta_{HV} - A_{12}| + \sigma} + 1\right] \times \left[\frac{A_1 - \delta_{HV} - \sigma}{|A_1 - \delta_{HV}| + \sigma} + 1\right]$$

Figure 10:
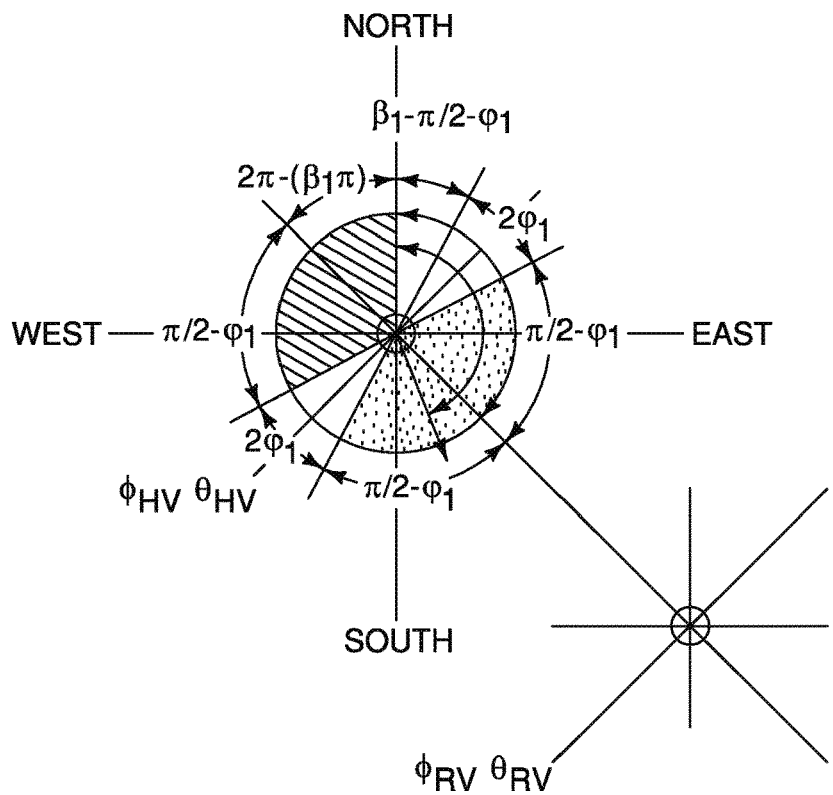
FIG. 10 is a graphical representation of a first remote vehicle located to the southeast of the host vehicle as used in calculations performed by the collision warning system during the operation of the flowchart of FIG. 5.

FIG. 10 illustrates a condition in which the first remote vehicle 14 is in quadrant Q4 to the southeast of the host vehicle 10.

$$Q_4 = \frac{1}{4}\left[\frac{\phi_{HV} - \phi_{RV} + \sigma}{|\phi_{HV} - \phi_{RV}| + \sigma} + 1\right] \times \left[\frac{\theta_{RV} - \theta_{HV} - \sigma}{|\theta_{RV} - \theta_{HV}| + \sigma} + 1\right]$$

When the first remote vehicle 14 is southeast of the host vehicle 10, as shown in FIG. 10, the latitude of the first remote vehicle 14 is less than the latitude of the host vehicle 10 but the longitude of the first remote vehicle 14 is greater than the longitude of the host vehicle 10. Under these conditions, the expression for Q4 above will equal 1, otherwise it will equal 0.

The first remote vehicle 14 is determined to be ahead of the host vehicle 10 in step S120 of FIG. 6 when the following equation is satisfied:

$$A_{12} \le \delta_{HV} < A_1$$

where $A_1 = \beta_1 + \frac{\pi}{2} - \varphi_1$, and $A_{12} = \beta_1 - \frac{\pi}{2} + \varphi_1$.

This region is identified as the dotted area in FIG. 10. These conditions can be defined in one mathematical exnression as:

$$P_{Q_4} = \frac{1}{4}\left[\frac{\delta_{HV} - A_{12} + \sigma}{|\delta_{HV} - A_{12}| + \sigma} + 1\right] \times \left[\frac{A_1 - \delta_{HV} - \sigma}{|A_1 - \delta_{HV}| + \sigma} + 1\right]$$

The results of the detection analysis are then added together using the following equation:

$$X = \Sigma_{i=1}^{4} P_{Q_i}$$

When X=1, the first remote vehicle 14 is determined to be ahead of the host vehicle in in step S120 of FIG. 6. When the first remote vehicle 14 is not ahead of the host vehicle 10, the process moves to step S170 in which a no result is returned to step S10 of the flowchart of FIG. 5.

When the first remote vehicle 14 is determined to be ahead of the host vehicle 10, the process proceeds to step S130 to check whether the heading angle of the first remote vehicle 14 is constant. When the heading angle of the first remote vehicle 14 is constant, the process moves to step S170 in which a no result is returned to step S10 of the flowchart of FIG. 5. The heading angle of the first remote vehicle 14 is constant when the first remote vehicle is traveling on a straight road. In other words, the heading angle of the first remote vehicle 14 is constant when the first remote vehicle is not on a curved road.

When the heading angle of the first remote vehicle 14 is not constant in step S130 of FIG. 6, the process proceeds to step S140 to determine whether the first remote vehicle 140 is at least a predetermined distance away from the host vehicle. The predetermined distance can be any suitable distance, such as 100 meters. When the first remote vehicle 14 is not at least the predetermined distance away from the host vehicle 10, the process moves to step S170 in which a no result is returned to step S10 of the flowchart of FIG. 5.

When the first remote vehicle is determined to be greater than the predetermined distance away from the host vehicle in steps S140 of FIG. 6, the process proceeds to step S150 to determine whether the temporary identification received from the first remote vehicle 14 is the first instance of receiving the basic safety message from the first remote vehicle 14. When the basic safety message is the first received from the first remote vehicle 14, the process moves to step S160 and saves the temporary identification of the first remote vehicle, such as in the storage device 30 (FIG. 2), and moves to step S165 and initializes a first index counter i to 0. The process then proceeds to step S180 and returns a yes result to step S10 of the flowchart of FIG. 5. When the temporary identification of the first remote vehicle 14 is already saved in step S150, the process moves to step S180 and returns a yes result to step S10 of the flowchart of FIG. 5.

The process in the flowchart of FIG. 5 moves to step S20 when the first remote vehicle 14 is detected in step S10. Otherwise, the process ends when the first remote vehicle 14 is not detected in step S10. In step S20, a traveling path of the first remote vehicle 14 is defined. The process of defining the traveling path of the first remote vehicle 14 is illustrated in the flowchart of FIG. 11.

The electronic controller 24 decodes the BSM from the first remote vehicle 14 (FIG. 12) in step S200 of FIG. 11. The process moves to step S210 and checks whether the temporary identification of the first remote vehicle contained in the BSM from step S200 matches the temporary identification stored in step S160 of the flowchart of FIG. 6. When the temporary identification is not the same as the stored identification, the process moves to step S250 and a no result is returned to step S20 of FIG. 5, which ends the process. When the temporary identification is the same as the stored identification, the latitude ($\phi$), longitude ($\theta$), and heading ($\delta$) of the first remote vehicle 14 is stored in the path table in step S220. The process moves to step S230 and increments the first index counter i by 1. In step S240, the first index counter i is checked to determine whether the first index counter is equal to a predetermined number M. When the first index counter i is less than the predetermined number M, the process continues to loop back to the main process flow of FIG. 5 and re-enter this process to accumulate GPS positional points, or information, from the first remote vehicle 14 with the same temporary identification until the first index counter i is equal to the predetermined number M at which point the traveling path of the first remote vehicle 14 has been successfully created as shown in FIG. 12.

Each of the solid dots shown in FIG. 12 corresponds to a different positional information of the first remote vehicle 14 received in a different data transmission by the host vehicle 10. Each solid dot corresponds to received positional information having a different first index counter. The solid dot farthest from the first remote vehicle 14 corresponds to the first received positional information from the first remote vehicle 14, and has a first index counter of 0. The next solid dot corresponds to the first index counter equal to 1, and so forth. When the first index counter equals the predetermined number M, a sufficient number of positional information is received from the first remote vehicle 14 to define the travel path, which corresponds to the solid dots shown in FIG. 12.

The value of the predetermined number M can be defined according to various methods, such as a function of the vehicle steering wheel angle of the first remote vehicle, which is included in the transmitted BSM. The larger the steering wheel angle, the sharper the curve of the road, and the smaller the radius R, as shown in FIG. 12. The predetermined number M can be larger when the detected steering wheel angle is larger, such that the sharper curve can be more accurately defined. The collision warning system 12 of the host vehicle 10 can sample the received basic safety message for positional information of the first remote vehicle 14 every 100 milliseconds for a number of seconds, such as between 7 and 10 seconds for a larger detected steering wheel angle. For a lower detected steering wheel angle, the collision warning system 12 of the host vehicle samples the basic safety message for positional information of the first remote vehicle 14 every 200 milliseconds, or even every 500 milliseconds, for a number of seconds, such as between 7 and 10 seconds. The predetermined number M can be any suitable number, such as twenty. The predetermined number M corresponds to the number of different data transmission received from the first remote vehicle 14 by the host vehicle 10 to define the travel path.

When the first index counter i reaches the predetermined number M in step S240, a yes result is set in step S260 and returned to step S20 of the flowchart of FIG. 5. The process has defined the traveling path of the first remote vehicle 14, and the process then moves to step S30 to determine whether the host vehicle 10 is on the traveling path of the first remote vehicle 14.

Figure 13:
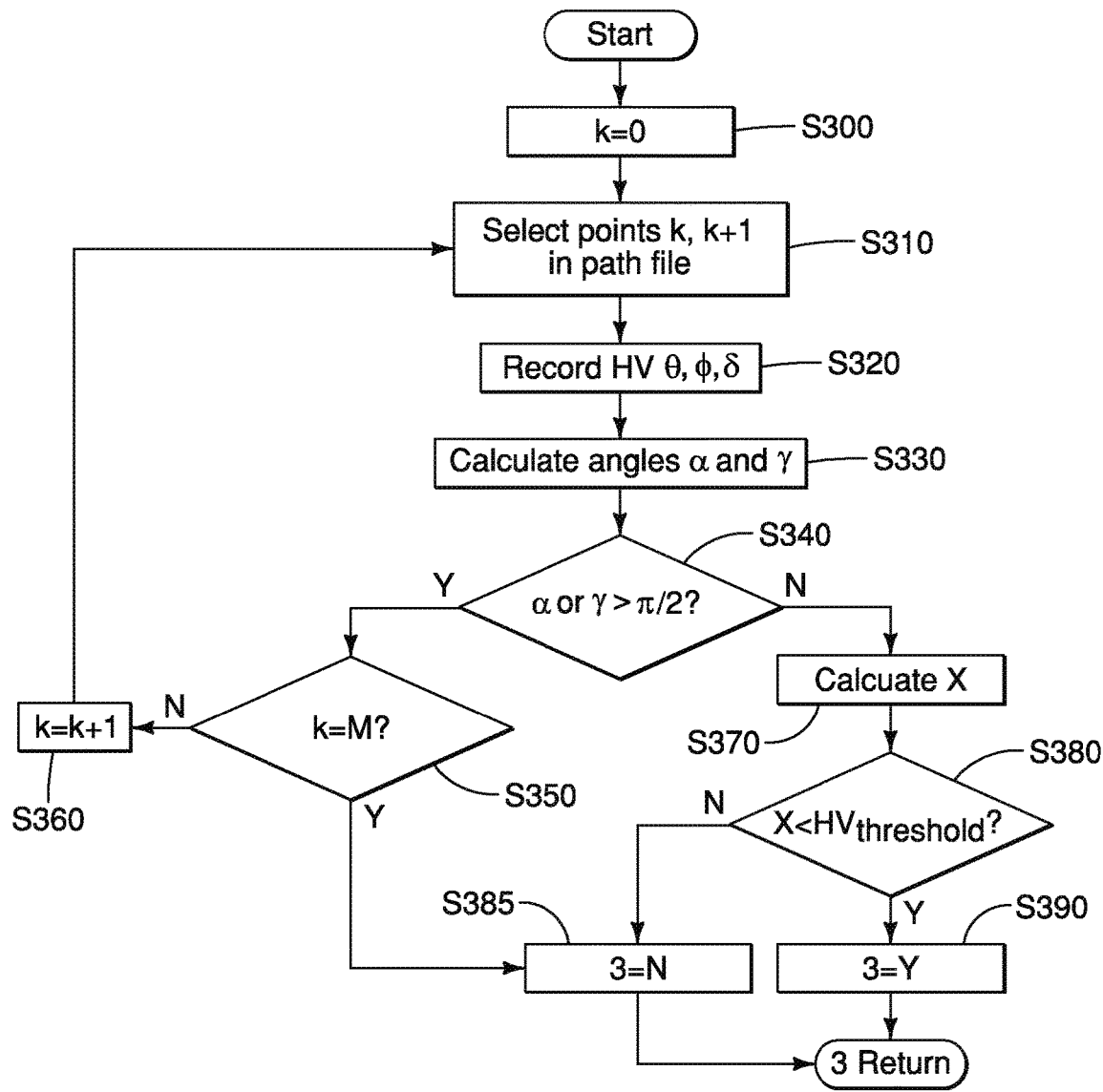
FIG. 13 is a flowchart illustrating a process of determining whether the host vehicle is on the path defined by the first remote vehicle during operation of the flowchart of FIG. 5.

The process of determining whether the host vehicle 10 is on the traveling path of the first remote vehicle 14 is illustrated in the flowchart of FIG. 13. In step S300, a second index counter k is set to 0. In step S310, two consecutive points from the path table (step S220 of FIG. 11) corresponding to the second index counter k and the next second index counter k+1 are selected. The current position of the host vehicle 10 is then recorded in step S320. The current positional information of the host vehicle 10 is indicated by the open dots in FIG. 12. The current positional information includes the latitude ($\phi$), longitude ($\theta$), and heading ($\delta$) of the host vehicle 10. Using the current positional information of the host vehicle 10 recorded in step S320, the collision warning system 12 calculates angles $\alpha$ and $\gamma$ in step S330 according to the following expressions. The angles $\alpha$ and $\gamma$ are defined in FIG. 14. The angle $\alpha$ is between the positional information of the first remote vehicle 14 corresponding to the index counter k and the current position hv of the host vehicle 10 corresponding to the positional information recorded in step S320. The angle $\gamma$ is between the positional information of the first remote vehicle 14 corresponding to the index counter k+1 and the current position hv of the host vehicle 10.

$$\alpha = \cos^{-1}\left(\frac{l_1^2 + l_2^2 - l_3^2}{2l_1 l_2}\right)$$

$$\gamma = \cos^{-1}\left(\frac{l_1^2 + l_3^2 - l_2^2}{2l_1 l_3}\right)$$

$$l_1 = (1-f)r_e\sqrt{\frac{(\theta_{RV_2} - \theta_{RV_1})^2\cos^2\phi_{RV_1} + (\phi_{RV_2} - \phi_{RV_1})^2}{\sin^2\phi_{RV_1} + (1-f)^2\cos^2\phi_{RV_1}}}$$

-continued $$l_2 = (1-f)r_e\sqrt{\frac{(\theta_{HV}-\theta_{RV_1})^2\cos^2\phi_{RV_1}+(\phi_{HV}-\phi_{RV_1})^2}{\sin^2\phi_{RV_1}+(1-f)^2\cos^2\phi_{RV_1}}}$$

$$l_3 = (1-f)r_e\sqrt{\frac{(\theta_{RV_2}-\theta_{HV})^2\cos^2\phi_{HV}+(\phi_{RV_2}-\phi_{HV})^2}{\sin^2\phi_{HV}+(1-f)^2\cos^2\phi_{HV}}}$$

f=1/298.257223563 (earth flattening)
$\theta_{HV}$=HV longitude
$\phi_{HV}$=HV latitude
$\theta_{RV}$=RV longitude
$\phi_{RV}$=RV latitude The system checks the magnitude of angles α and γ in step S340 to determine whether they are 90° or less (π/2). An angle α or γ greater than 90° (π/2) indicates that the positon of the host vehicle 10 does not fall between the two consecutive path points, k and k+1, from the path table, making the determination of the value X difficult. The distance X is the length of the current position of the host vehicle 10 perpendicular to the line segment 11 joining the positions of the first remote vehicle 14 corresponding to the second index counters k and k+1. When the angle α or γ is greater than 90° (π/2) in step S340, the process moves to step S350 to check whether the second index counter k equals the predetermined number M. When the second index counter k is not equal to the predetermined number M in step S350, the second index counter is incremented by one in step S360, and the process loops back to step S310 and two new consecutive path points k and k+1 are selected from the path table (S220 of FIG. 11). When the second index counter k is equal to the predetermined number M in step S350, the host vehicle 10 is not on the defined traveling path and the process moves to step S385 and returns a no result to step S30 of the flowchart of FIG. 5. When neither angle α or γ is greater than 90° (π/2) in step S340, the process calculates the value of the distance X in step S370 according to the following expression:

$$X = l_2\sin\alpha = l_2\sin\left(\cos^{-1}\left(\frac{l_1^2+l_2^2-l_3^2}{2l_1l_2}\right)\right)$$

Figure 14:
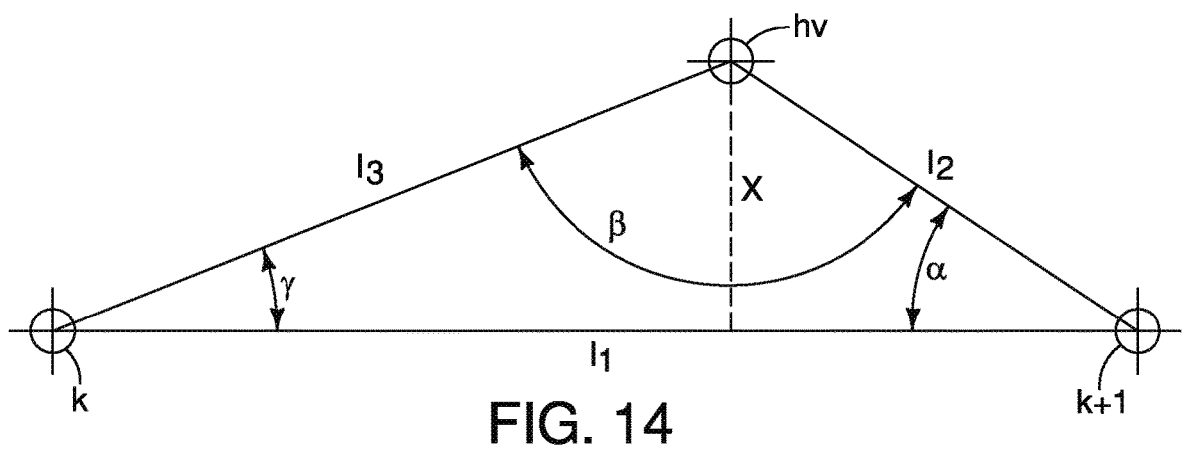
FIG. 14 is a diagrammatic view illustrating determining whether the host vehicle is on the path defined by the first remote vehicle during operation of the flowchart of FIG. 13.

FIG. 14 provides an illustrative relationship between $l_1$, $l_2$, $l_3$, α, γ and X. The magnitude of the distance X is checked in step S380. When the value of the distance X is less than or equal to a specific threshold value (HVthreshold), such as two (2) meters, the host vehicle 10 is defined to be on the defined traveling path. The threshold value (HVthreshold) is any suitable value, such as approximately half of a width of a lane 38 of the road 36. The process moves to step S390 and returns a yes result to step S30 of the flowchart of FIG. 5. When the value of the distance X is greater than the specific threshold, the host vehicle 10 is defined to not be on the defined traveling path and the process moves to step S385 and returns a no result to step S30 of the flowchart of FIG. 5, which ends the process.

When the value of the distance X is determined to be less than the specific threshold value (HVthreshold) in step S380 of the flowchart of FIG. 13, a yes result is set in step S390 and returned to step S30 of the flowchart of FIG. 5, which indicates that the host vehicle 10 is on the defined traveling path of the first remote vehicle 14, as shown in FIGS. 4 and 12. The travel path of the first remote vehicle 14 is set as the travel path of the host vehicle 10 in step S30 when the host vehicle 10 is determined to be on the travel path of the first remote vehicle 14 in the flowchart of FIG. 13. The defined traveling path of the first remote vehicle 14 maps the straight road 44 on which the host vehicle 10 is traveling in FIG. 4 or the curved road 36 on which the host vehicle 10 is traveling in FIG. 12, such that the collision warning system 12 (FIG. 2) operates without reliance on map data of the navigation system of the host vehicle. The process them moves to step S40 of the flowchart of FIG. 5 to determine whether a potential threat vehicle (PTV) is detected.

Figure 15:
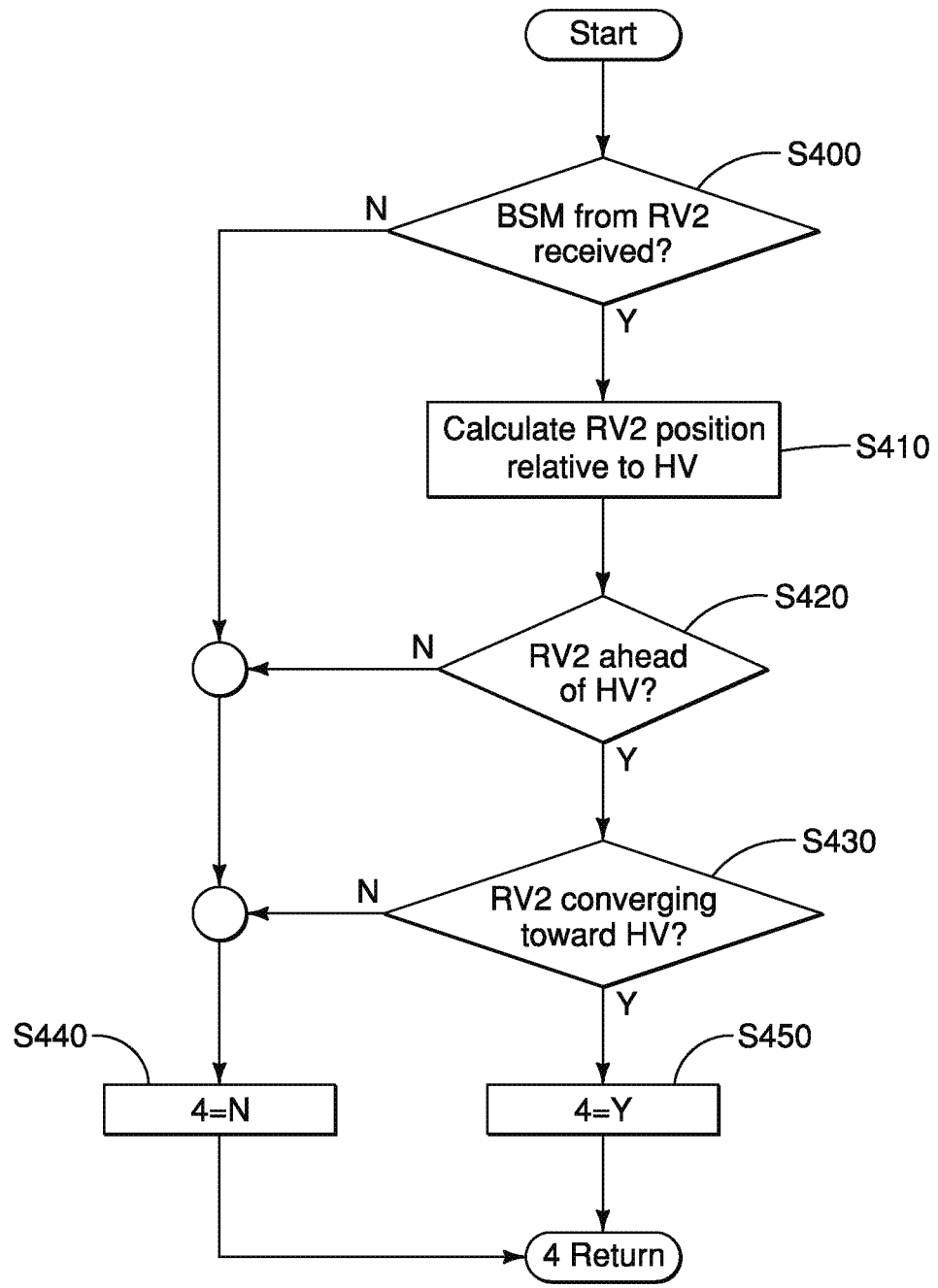
FIG. 15 is a flowchart illustrating a process of determining whether a second remote vehicle is a possible threat vehicle during operation of the flowchart of FIG. 5.

The process of detecting a potential threat vehicle is illustrated in the flowchart of FIG. 15. In step S400, the collision warning system determines whether a basic safety message (BSM) is received from a second remote vehicle 16 (FIGS. 3 and 4). When a BSM is not received from the second remote vehicle 16, the process moves to step S440 and returns a no result to step S40 of the flowchart of FIG. 5, which ends the process. When a BSM is received from the second remote vehicle 16 is step S400, the process moves to step S40 in which the collision warning system 12 calculates the position of the second remote vehicle 16 relative to the host vehicle 10 based on the positional information included in the received BSM. The collision warning system 12 then checks whether the second remote vehicle 16 is ahead of the host vehicle 10 in step S420. When the second remote vehicle 16 is determined to not be ahead of the host vehicle 10, the process moves to step S440 and returns a no to step S40 of the flowchart of FIG. 5. When the second remote vehicle 16 is determined to be ahead of the host vehicle 10, as shown in FIGS. 3 and 4, the process moves to steps S430 to determine whether the second remote vehicle 16 is converging toward the host vehicle 10. When the second remote vehicle 16 is not converging toward the host vehicle 10, the process moves to step S440 and returns a no result to step S40 of the flowchart of FIG. 5. When the second remote vehicle 16 is determined to be converging, or moving toward, the host vehicle, as shown in FIGS. 3 and 4, the process moves to step S450 and returns a yes result to step S40 of the flowchart of FIG. 5 indicating that the second remote vehicle 16 is a potential threat vehicle.

When the second remote vehicle 16 is identified as a potential threat vehicle (PTV) in step S40 of FIG. 5, the process moves to step S50 to determine whether the second remote vehicle, or potential threat vehicle, 16 is on the defined travel path. In step S30, the host vehicle 10 has already been determined to be on the defined traveling path. The process of determining whether the second remote vehicle 16 is on the defined traveling path is illustrated in the flowchart of FIG. 16.

Figure 16:
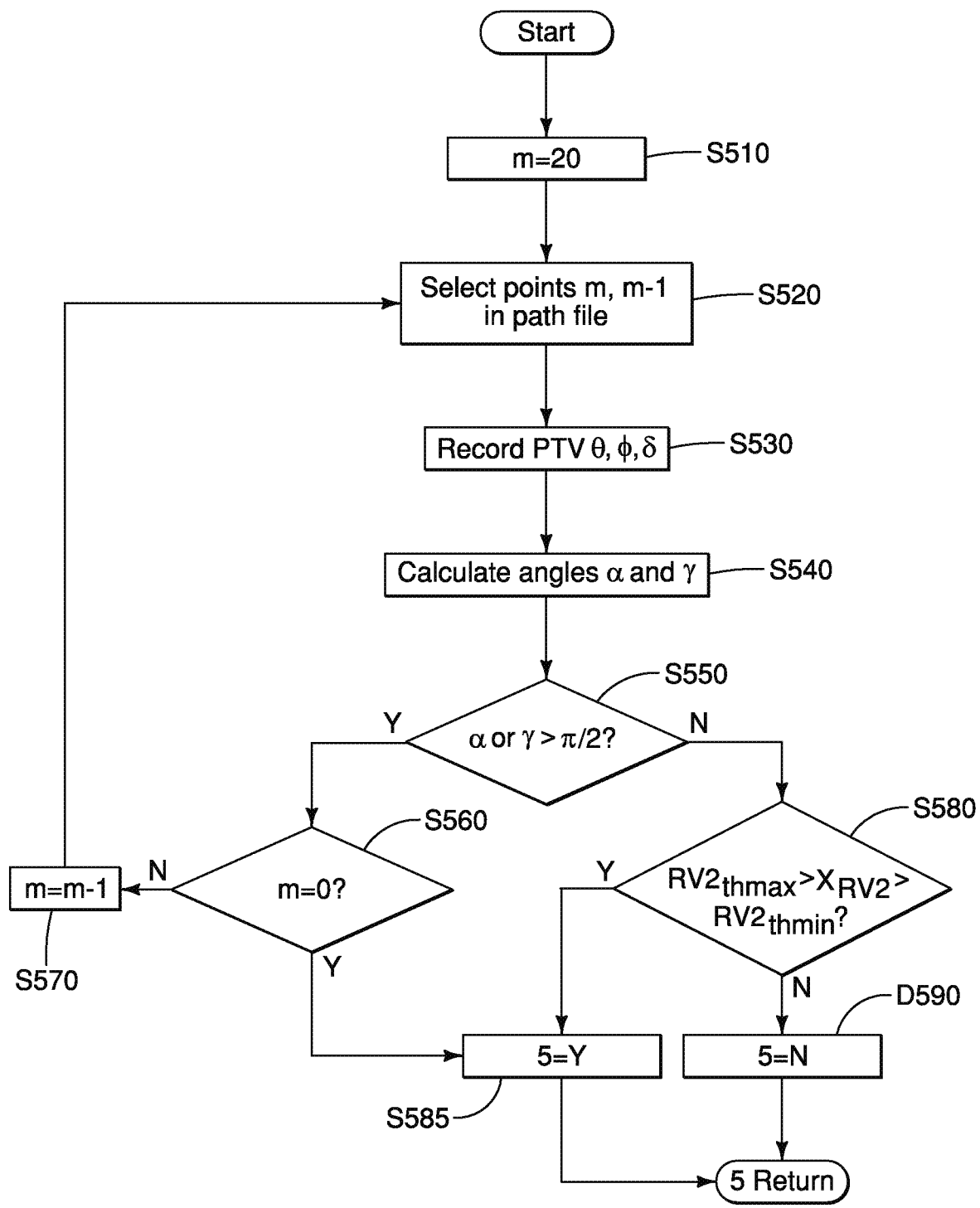
FIG. 16 is a flowchart illustrating a process of determining whether the possible threat vehicle is on the path defined by the first remote vehicle during operation of the flowchart of FIG. 5.

The process of determining whether the second remote vehicle 16 is on the defined traveling path as illustrated in the flowchart of FIG. 16 is substantially similar to the process of determining whether the host vehicle 10 is on the defined traveling illustrated in the flowchart of FIG. 13. In the process illustrated in FIG. 13, the comparison between the current position of the host vehicle 10 and the consecutive data points of the defined traveling path started at the data points farthest from the first remote vehicle 14. In other words, the consecutive data points used began with those closest to the host vehicle 10. Similarly, the consecutive data points used to determine whether the second remote vehicle 16 is on the defined traveling path are the data points closest to the second remote vehicle. In other words, the data points closest to the second remote vehicle 16. In view of this, in step S510 of FIG. 16, a third index counter m is set to twenty (20), or the last data point stored in the path file in step S220 of FIG. 11. In step S520, two consecutive points from the path table (step S220 of FIG. 11) corresponding to the third index counter m and the preceding third index counter m−1 are selected. The current position of the second remote vehicle 16 is then recorded in step S530. The current positional information of the second remote vehicle 16 includes the latitude (ϕ), longitude (θ), and heading (δ) of the of the second remote vehicle 16. Using the current positional information of the host vehicle 10 recorded in step S530, the collision warning system 12 calculates angles α and γ in step S540 similarly to step S330 of FIG. 13. The angle α is between the positional information of the first remote vehicle 14 corresponding to the index counter m and the current position of the second remote vehicle 16 corresponding to the positional information recorded in step S530. The angle γ is between the positional information of the first remote vehicle 14 corresponding to the index counter m−1 and the current position of the second remote vehicle 16. With regard to the process of FIG. 16, the graphical representation illustrated in FIG. 14 is substantially similar, with the following changes. The current position hv of the host vehicle 10 corresponds to the current position of the second remote vehicle 16. The data point k+1 corresponds to the data point m. The data point k corresponds to the data point m−1.

The collision warning system 12 checks the magnitude of angles α and γ in step S550 to determine whether they are 90° or less (π/2). An angle α or γ greater than 90° (π/2) indicates that the positon of the second remote vehicle 16 does not fall between the two consecutive path points, m and m−1, from the path table, making the determination of the value X difficult. The distance X is the length of the current position of the second remote vehicle 16 perpendicular to the line segment 11 joining the positions of the first remote vehicle 14 corresponding to the third index counters m and m−1. When the angle α or γ is greater than 90° (π/2) in step S550, the process moves to step S560 to check whether the third index counter m equals zero. When the third index counter m is not equal to zero in step S560, the third index counter is decreased by one in step S570, and the process loops back to step S520 and two new consecutive path points m and m−1 are selected from the path table (S220 of FIG. 11). When the third index counter m is equal to zero in step S560, the second remote vehicle 16 is not on the defined traveling path and the process moves to step S585 and returns a yes result to step S50 of the flowchart of FIG. 5. A yes result is returned in step S585 because the second remote vehicle 16 remains a potential threat vehicle because the traveling path of the second remote vehicle 16 is not determined to be on the traveling path of the host vehicle 10. The collision warning system 12 proceeds to step S60 of the flowchart of FIG. 5 to determine whether a crossing path between the host vehicle 10 and the second remote vehicle 16 is detected.

When neither angle α or γ is greater than 90° (π/2) in step S550, the process calculates the value of the distance XRV2 similarly to calculating the distance X in step S370 of FIG. 13. The distance XRV2 is the perpendicular distance of the second remote vehicle 16 to the line intersecting the current two data points m and m−1 being evaluated.

The magnitude of the distance XRV2 is checked in step S580. When the value of the distance XRV2 is between a minimum threshold value RV2$_{thmin}$ and a maximum threshold value RV2$_{thmax}$, such as between 1.5 and 5.5 meters, respectively, the second remote vehicle 16 is determined to be on the defined traveling path. The minimum and maximum threshold values are any suitable values, such as approximately half of a width of a lane 38 of the road 36, and 1.5 times the width of the lane 38 of the road 36. This range approximates a position of the second remote vehicle 16 being in a lane 40 adjacent to the lane 38 of the host vehicle 10, as shown in FIG. 3. The process moves to step S590 and returns a yes result to step S50 of the flowchart of FIG. 5. A yes result returned in step S585 of FIG. 16 indicates that the second remote vehicle 16 is on the defined path, and in the adjacent lane 40 (FIG. 3). The yes result returned to step S50 of FIG. 5 ends the process, such that a warning is not generated. This prevents a warning from being generated in the situation presented in FIG. 3 in which the second remote vehicle 16 is on the traveling path of the host vehicle 10, but in the lane 40 adjacent to the lane 38 in which the host vehicle 10 is traveling. Existing collision warning systems rely on map data such that a warning is generated for an intersecting path 40 at a position that lies off the road 36. The intersecting path 42 is a false warning, because the road geometry prevents the host vehicle 10 and the second remote vehicle 16 from crossing paths at a position off the road 36. The collision warning system 12 in accordance with exemplary embodiments of the present invention does not rely on existing map data of a navigation system of the host vehicle 10 such that a false warning in a situation as shown in FIG. 3 is prevented, or suppressed, from being issued. The collision warning system 12 of the exemplary embodiments of the present invention substantially eliminate nuisance warnings due to roadway geometry, as shown in FIG. 3.

When the value of the distance XRV2 is not within the specified range in step S580 of FIG. 16, the second remote vehicle 16 is defined to not be on the defined travel path and the process moves to step S585 and returns a no result to step S50 of the flowchart of FIG. 5. As shown in FIG. 4, the second remote vehicle 16 traveling on the road 46 would return a no result in step S550, but would fall outside the range in step S580, such that the second remote vehicle 16 in FIG. 4 is determined to not be on the defined travel path of the host vehicle 10 on the road 44. The collision warning system 12 proceeds to step S60 to determine whether a crossing, or intersecting, path exists between the host vehicle 10 and the second remote vehicle 16 because the second remote vehicle 16 has been determined to not be on the traveling path of the host vehicle 10.

In step S60 of the flowchart of FIG. 5, the collision warning system 12 determines whether a crossing path exists between the host vehicle 10 and the second remote vehicle 16. When the host vehicle 10 and the second remote vehicle 16 approach each other from directions that result in a crossing path, as shown in FIG. 4, the heading angle $\delta_{RV}$ of the second remote vehicle 16 can be defined as a function of the heading angle $\delta_{HV}$ of the host vehicle according to the following expressions. Because a crossing path can occur if the second remote vehicle 16 approaches from the left or right, four angles must be defined: minimum and maximum angles for the left and minimum and maximum angles for the right. When the heading angle $\delta_{RV}$ of the second remote vehicle 16 falls within the two ranges, a crossing path is determined to exist.

The second remote vehicle heading angle as a function of the host vehicle heading angle for the case of vehicle crossing paths can be defined as follows:
Minimum RV Heading Angle $$\delta_{RV_{minL}}^{11} = \frac{1}{4}\left[\frac{\delta_{HV} - 0 + \sigma}{|\delta_{HV} - 0| + \sigma} + 1\right] \times \left[\frac{\varphi_6 - \delta_{HV} - \sigma}{|\varphi_6 - \delta_{HV}| + \sigma} + 1\right] \times (\delta_{HV} + \varphi_3) +$$

-continued $$\frac{1}{4}\left[\frac{\delta_{HV} - \varphi_6 + \sigma}{|\delta_{HV} - \varphi_6| + \sigma} + 1\right] \times \left[\frac{2\pi - \delta_{HV} - \sigma}{|2\pi - \delta_{HV}| + \sigma} + 1\right] \times (\delta_{HV} - \varphi_6)$$

$$\delta^{11}_{RV_{minR}} = \frac{1}{4}\left[\frac{\delta_{HV} - 0 + \sigma}{|\delta_{HV} - 0| + \sigma} + 1\right] \times \left[\frac{\varphi_4 - \delta_{HV} - \sigma}{|\varphi_4 - \delta_{HV}| + \sigma} + 1\right] \times (\delta_{HV} + \varphi_5) +$$

$$\frac{1}{4}\left[\frac{\delta_{HV} - \varphi_4 + \sigma}{|\delta_{HV} - \varphi_4| + \sigma} + 1\right] \times \left[\frac{2\pi - \delta_{HV} - \sigma}{|2\pi - \delta_{HV}| + \sigma} + 1\right] \times (\delta_{HV} - \varphi_4)$$

Maximum RV Heading Angle $$\delta^{11}_{RV_{maxL}} = \frac{1}{4}\left[\frac{\delta_{HV} - 0 + \sigma}{|\delta_{HV} - 0| + \sigma} + 1\right] \times \left[\frac{\varphi_5 - \delta_{HV} - \sigma}{|\varphi_5 - \delta_{HV}| + \sigma} + 1\right] \times (\delta_{HV} + \varphi_4) +$$

$$\frac{1}{4}\left[\frac{\delta_{HV} - \varphi_5 + \sigma}{|\delta_{HV} - \varphi_5| + \sigma} + 1\right] \times \left[\frac{2\pi - \delta_{HV} - \sigma}{|2\pi - \delta_{HV}| + \sigma} + 1\right] \times (\delta_{HV} - \varphi_5)$$

$$\delta^{11}_{RV_{maxR}} = \frac{1}{4}\left[\frac{\delta_{HV} - 0 + \sigma}{|\delta_{HV} - 0| + \sigma} + 1\right] \times \left[\frac{\varphi_3 - \delta_{HV} - \sigma}{|\varphi_3 - \delta_{HV}| + \sigma} + 1\right] \times (\delta_{HV} + \varphi_6) +$$

$$\frac{1}{4}\left[\frac{\delta_{HV} - \varphi_3 + \sigma}{|\delta_{HV} - \varphi_3| + \sigma} + 1\right] \times \left[\frac{2\pi - \delta_{HV} - \sigma}{|2\pi - \delta_{HV}| + \sigma} + 1\right] \times (\delta_{HV} - \varphi_3)$$

where $$\varphi_3 = \frac{\pi}{2} - \varphi_L$$

$$\varphi_4 = \frac{\pi}{2} + \varphi_L$$

$$\varphi_5 = \frac{3\pi}{2} - \varphi_R$$

$$\varphi_6 = \frac{3\pi}{2} + \varphi_R$$

$\varphi_L$ and $\varphi_R$ are threshold values that define the angular range in which the second remote vehicle 16 is defined to be in a crossing path with the host vehicle 10.

These variables define the minimum and maximum boundaries for the range of $\delta_{RV}$ with respect to $\delta_{HV}$ for crossing paths values of $\delta_{RV}$ that fall outside these ranges and are considered to be another condition, such as in-path, opposite path or diverging path. The direction, left or right, from which the second remote vehicle 16 is approaching is immaterial but a single equation for minimum and maximum heading angles of the second remote vehicle 16 is desired. This can be achieved by the following two equations:

$$\delta^{11}_{RV_{min}} = \frac{\delta^{11}_{RV_{minL}}}{2}\left[\frac{L_{Q_1} + L_{Q_2} - \sigma}{|L_{Q_1} + L_{Q_2}| + \sigma} + 1\right] + \frac{\delta^{11}_{RV_{minR}}}{2}\left[\frac{R_{Q_1} + R_{Q_2} - \sigma}{|R_{Q_1} + R_{Q_2}| + \sigma} + 1\right]$$

$$\delta^{11}_{RV_{max}} = \frac{\delta^{11}_{RV_{maxL}}}{2}\left[\frac{L_{Q_1} + L_{Q_2} - \sigma}{|L_{Q_1} + L_{Q_2}| + \sigma} + 1\right] + \frac{\delta^{11}_{RV_{maxR}}}{2}\left[\frac{R_{Q_1} + R_{Q_2} - \sigma}{|R_{Q_1} + R_{Q_2}| + \sigma} + 1\right]$$

Where:

$$L_{Q_1} = L_{Q_4} = \frac{1}{4}\left[\frac{\delta_{HV} - A_6 + \sigma}{|\delta_{HV} - A_6| + \sigma} + 1\right] \times \left[\frac{A_7 - \delta_{HV} - \sigma}{|A_7 - \delta_{HV}| + \sigma} + 1\right]$$

$$L_{Q_2} = L_{Q_3} = \frac{1}{4}\left[\frac{\delta_{HV} - 0 + \sigma}{|\delta_{HV} - 0| + \sigma} + 1\right] \times \left[\frac{A_{13} - \delta_{HV} - \sigma}{|A_{13} - \delta_{HV}| + \sigma} + 1\right] +$$

$$\frac{1}{4}\left[\frac{\delta_{HV} - A_{16} + \sigma}{|\delta_{HV} - A_{16}| + \sigma} + 1\right] \times \left[\frac{2\pi - \delta_{HV} - \sigma}{|2\pi - \delta_{HV}| + \sigma} + 1\right]$$

$$R_{Q_1} = R_{Q_4} = \frac{1}{4}\left[\frac{\delta_{HV} - 0 + \sigma}{|\delta_{HV} - 0| + \sigma} + 1\right] \times \left[\frac{A_5 - \delta_{HV} - \sigma}{|A_5 - \delta_{HV}| + \sigma} + 1\right] +$$

$$\frac{1}{4}\left[\frac{\delta_{HV} - A_8 + \sigma}{|\delta_{HV} - A_8| + \sigma} + 1\right] \times \left[\frac{2\pi - \delta_{HV} - \sigma}{|2\pi - \delta_{HV}| + \sigma} + 1\right]$$

-continued $$R_{Q_2} = R_{Q_3} = \frac{1}{4}\left[\frac{\delta_{HV} - A_{14} + \sigma}{|\delta_{HV} - A_{14}| + \sigma} + 1\right] \times \left[\frac{A_{15} - \delta_{HV} - \sigma}{|A_{15} - \delta_{HV}| + \sigma} + 1\right]$$

And:

$A_5 = \beta_1 - \varphi_2$ $A_6 = \beta_1 + \varphi_2$ $A_7 = \beta_1 + \pi - \varphi_2$ $A_8 = \beta_1 + \pi + \varphi_2$ $A_{13} = \beta_1 - \pi - \varphi_2$ $A_{14} = \beta_1 - \pi + \varphi_2$ $A_{15} = \beta_1 - \varphi_2$ $A_{16} = \beta_1 + \varphi_2$ The second remote vehicle 16 is considered to be in a crossing path with the host vehicle 10 when the heading angle of the second remote vehicle, $\delta_{RV}$, falls within the minimum and maximum heading angles of the second remote vehicle 16 as defined above. When the second remote vehicle 16 is approaching from the left, there are three regions that need to be considered:

$$0 \leq \delta_{HV} < \frac{3\pi}{2} - \varphi_L \rightarrow \begin{cases} \delta_{HV} < \delta^{11}_{RV_{min}} \\ \delta_{HV} < \delta^{11}_{RV_{max}} \end{cases}$$

$$\frac{3\pi}{2} - \varphi_L \leq \delta_{HV} < \frac{3\pi}{2} + \varphi_L \rightarrow \begin{cases} \delta_{HV} < \delta^{11}_{RV_{min}} \\ \delta_{HV} > \delta^{11}_{RV_{max}} \end{cases}$$

$$\frac{3\pi}{2} + \varphi_L \leq \delta_{HV} < 2\pi \rightarrow \begin{cases} \delta_{HV} > \delta^{11}_{RV_{min}} \\ \delta_{HV} > \delta^{11}_{RV_{max}} \end{cases}$$

Figure 17:
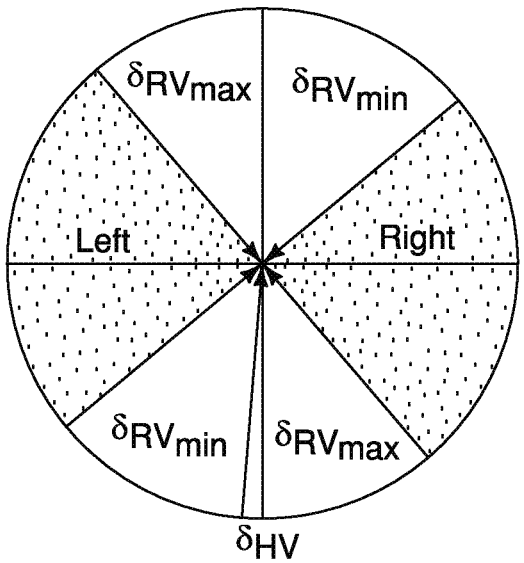
FIGS. 17-28 are graphical representations of heading angles of the host vehicle and the second remote vehicle in relation to each other as used in calculations performed by the collision warning system during operation of the flowchart of FIG. 16.
Figure 18:
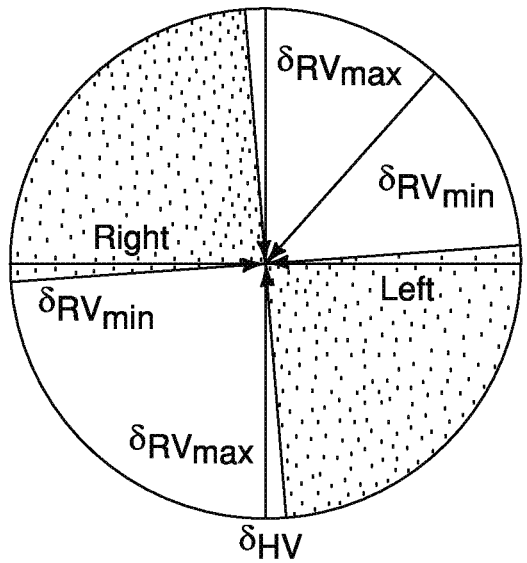
Figure 19:
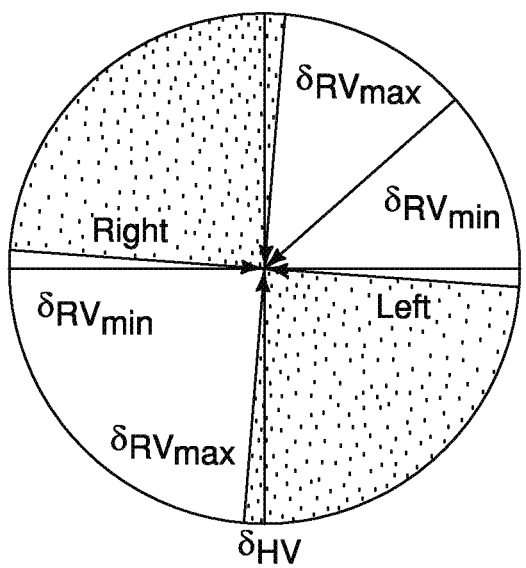
Figure 20:
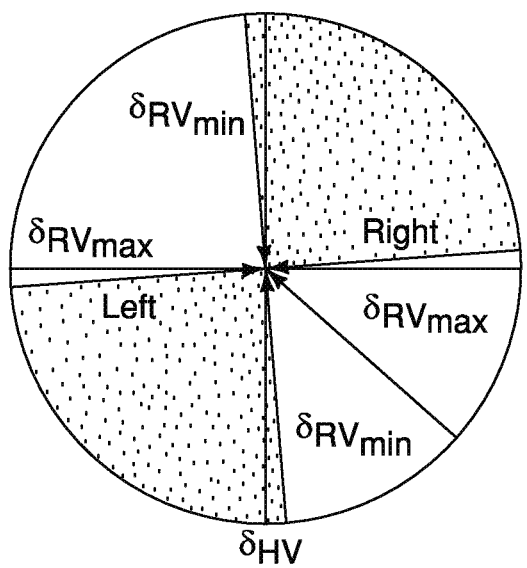
Figure 21:
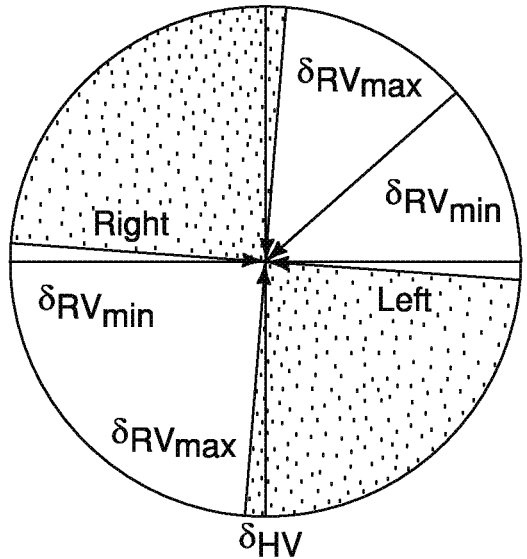
Figure 22:
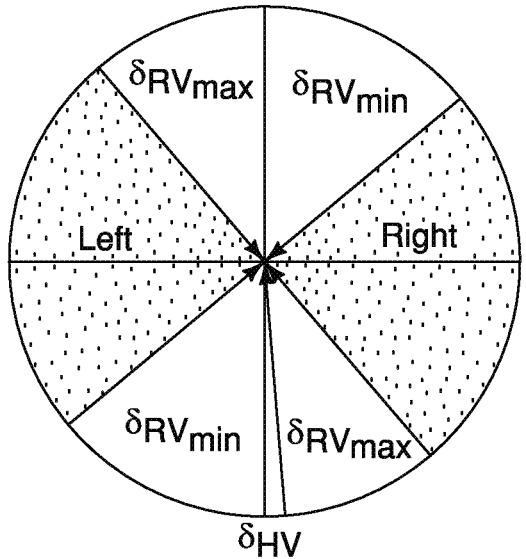

These three regions are illustrated in FIGS. 17-22. The first equation is illustrated in FIGS. 17 and 18. The second equation is illustrated in FIGS. 19 and 20. The third equation is illustrated in FIGS. 21 and 22.

Similarly, when the second remote vehicle 16 is approaching from the right, there are three regions that need to be considered:

$$0 \leq \delta_{HV} < \frac{\pi}{2} - \varphi_R \rightarrow \begin{cases} \delta_{HV} < \delta^{11}_{RV_{min}} \\ \delta_{HV} < \delta^{11}_{RV_{max}} \end{cases}$$

$$\frac{\pi}{2} - \varphi_R \leq \delta_{HV} < \frac{\pi}{2} + \varphi_R \rightarrow \begin{cases} \delta_{HV} < \delta^{11}_{RV_{min}} \\ \delta_{HV} > \delta^{11}_{RV_{max}} \end{cases}$$

$$\frac{\pi}{2} + \varphi_R \leq \delta_{HV} < 2\pi \rightarrow \begin{cases} \delta_{HV} > \delta^{11}_{RV_{min}} \\ \delta_{HV} > \delta^{11}_{RV_{max}} \end{cases}$$

Figure 23:
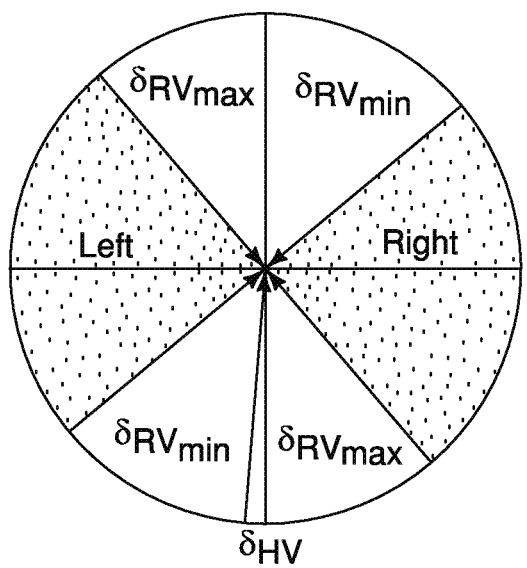
Figure 24:
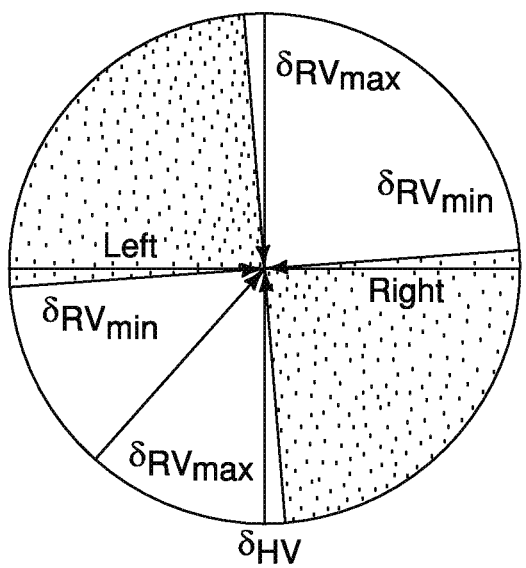
Figure 25:
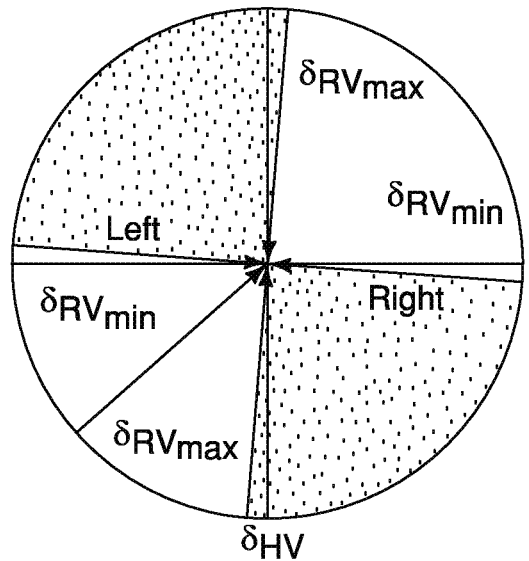
Figure 26:
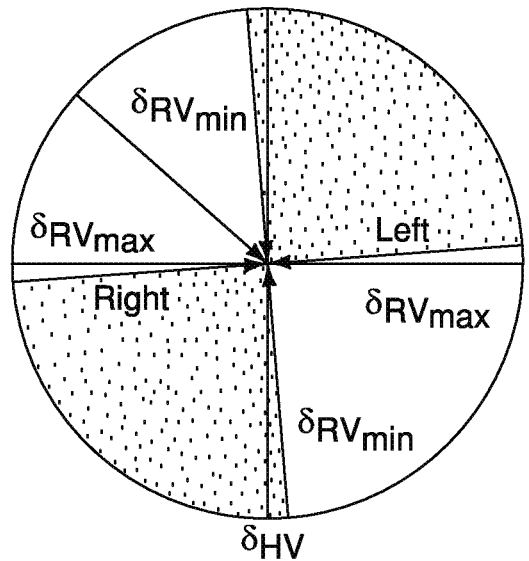
Figure 27:
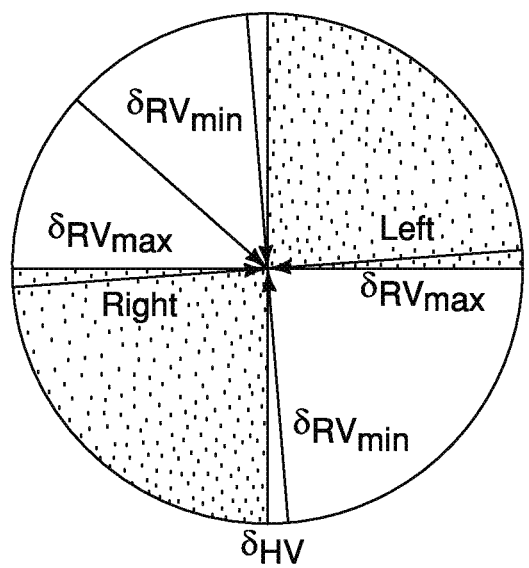
Figure 28:
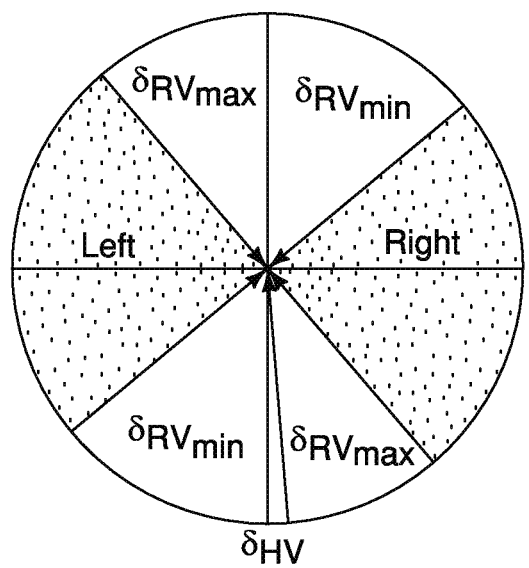

These three regions are illustrated in FIGS. 23-28. The first equation is illustrated in FIGS. 23 and 24. The second equation is illustrated in FIGS. 25 and 26. The third equation is illustrated in FIGS. 27 and 28.

Consider the following expressions for $H_1$ and $H_2$.

$H_1 = \delta_{HV} - \delta_{RV_{min}}^{11}$ $H_2 = \delta_{HV} - \delta_{RV_{max}}^{11}$ For any value of $\delta_{HV}$, the values for $H_1$ and $H_2$ fall within three distinct categories:

1: $H_1$ is negative, $H_2$ is negative and $H_1 > H_2$
2: $H_1$ is negative, $H_2$ is positive and $H_1 < H_2$
3: $H_1$ is positive, $H_2$ is positive and $H_1 > H_2$ From these three conditions, it can be shown that for any combination of $\delta_{HV}$ and $\delta_{RV}$, where $0 \leq \delta_{HV} < 2\pi$ and $0 \leq \delta_{RV} < 2\pi$ the following expressions can be used to identify whether a crossing path exists between the host vehicle 10 and the second remote vehicle 16.

$$\Delta_1^{11} = \frac{1}{8}\left[\frac{H_1 - H_2 - \sigma}{|H_1 - H_2| + \sigma} + 1\right] \times$$

$$\left[\frac{\delta_{RV} - \delta_{RV_{min}}^{11} + \sigma}{\left|\delta_{RV} - \delta_{RV_{min}}^{11}\right| + \sigma} + 1\right] \times \left[\frac{\delta_{RV_{max}}^{11} - \delta_{RV} - \sigma}{\left|\delta_{RV_{max}}^{11} - \delta_{RV}\right| + \sigma} + 1\right]$$

The expression above states that:

$\Delta_1^{11} = 1$ when $H_1 > H_2$ and $\delta_{RV_{min}}^{11} \leq \delta_{RV} < \delta_{RV_{max}}^{11}$ Otherwise $\Delta_1^{11} = 0$.

$$\Delta_2^{11} = \frac{1}{8}\left[1 - \frac{H_1 - H_2 - \sigma}{|H_1 - H_2| + \sigma}\right] \times$$

$$\left[\frac{\delta_{RV_{min}}^{11} - \delta_{RV} + \sigma}{\left|\delta_{RV_{min}}^{11} - \delta_{RV}\right| + \sigma} + 1\right] \times \left[\frac{\delta_{RV_{max}}^{11} - \delta_{RV} - \sigma}{\left|\delta_{RV_{max}}^{11} - \delta_{RV}\right| + \sigma} + 1\right]$$

The expression above states that:

$\Delta_2^{11} = 1$ when $H_1 < H_2$ and $\delta_{RV_{min}}^{11} \leq \delta_{RV} < \delta_{RV_{max}}^{11}$ Otherwise $\Delta_2^{11} = 0$.

$$\Delta_3^{11} = \frac{1}{8}\left[1 - \frac{H_1 - H_2 - \sigma}{|H_1 - H_2| + \sigma}\right] \times$$

$$\left[\frac{\delta_{RV} - \delta_{RV_{min}}^{11} + \sigma}{\left|\delta_{RV} - \delta_{RV_{min}}^{11}\right| + \sigma} + 1\right] \times \left[\frac{\delta_{RV} - \delta_{RV_{max}}^{11} - \sigma}{\left|\delta_{RV} - \delta_{RV_{max}}^{11}\right| + \sigma} + 1\right]$$

The expression above states that:

$\Delta_3^{11} = 1$ when $H_1 < H_2$ and $\delta_{RV_{min}}^{11} \leq \delta_{RV}$ and $\delta_{RV_{max}}^{11} < \delta_{RV}$ Otherwise $\Delta_3^{11} = 0$.

Also, it is advantageous to define the difference of $H_1$ and $H_2$ as follows:

$H_1 - H_2 = \delta_{HV} - \delta_{RV_{min}}^{11} - (\delta_{HV} - \delta_{RV_{max}}^{11})$ Simplifying results in:

$H_1 - H_2 = \delta_{RV_{max}}^{11} - \delta_{RV_{min}}^{11}$

Then the expressions above can be expressed as:

$$\Delta_1^{11} = \frac{1}{8}\left[\frac{\delta_{RV_{max}}^{11} - \delta_{RV_{min}}^{11} - \sigma}{\left|\delta_{RV_{max}}^{11} - \delta_{RV_{min}}^{11}\right| + \sigma} + 1\right] \times$$

$$\left[\frac{\delta_{RV} - \delta_{RV_{min}}^{11} + \sigma}{\left|\delta_{RV} - \delta_{RV_{min}}^{11}\right| + \sigma} + 1\right] \times \left[\frac{\delta_{RV_{max}}^{11} - \delta_{RV} - \sigma}{\left|\delta_{RV_{max}}^{11} - \delta_{RV}\right| + \sigma} + 1\right]$$

$$\Delta_2^{11} = \frac{1}{8}\left[1 - \frac{\delta_{RV_{max}}^{11} - \delta_{RV_{min}}^{11} - \sigma}{\left|\delta_{RV_{max}}^{11} - \delta_{RV_{min}}^{11}\right| + \sigma}\right] \times$$

$$\left[\frac{\delta_{RV_{min}}^{11} - \delta_{RV} + \sigma}{\left|\delta_{RV_{min}}^{11} - \delta_{RV}\right| + \sigma} + 1\right] \times \left[\frac{\delta_{RV_{max}}^{11} - \delta_{RV} - \sigma}{\left|\delta_{RV_{max}}^{11} - \delta_{RV}\right| + \sigma} + 1\right]$$

$$\Delta_3^{11} = \frac{1}{8}\left[1 - \frac{\delta_{RV_{max}}^{11} - \delta_{RV_{min}}^{11} - \sigma}{\left|\delta_{RV_{max}}^{11} - \delta_{RV_{min}}^{11}\right| + \sigma}\right] \times$$

$$\left[\frac{\delta_{RV} - \delta_{RV_{min}}^{11} + \sigma}{\left|\delta_{RV} - \delta_{RV_{min}}^{11}\right| + \sigma} + 1\right] \times \left[\frac{\delta_{RV} - \delta_{RV_{max}}^{11} - \sigma}{\left|\delta_{RV} - \delta_{RV_{max}}^{11}\right| + \sigma} + 1\right]$$

By summing these three expressions, it can be determined that a crossing path exists between the host vehicle 10 and the second remote vehicle 16 when:

$\Sigma_{i=1}^{3} \Delta_i^{11} = 1 (RQ = 11)$

Thus:

$r_3 = \Sigma_{i=1}^{3} \Delta_i^{11} \times 1$ and $q_3 = \Sigma_{i=1}^{3} \Delta_i^{11} \times 1$ Finally:

$R = \Sigma_{i=1}^{3} r_i$ and $Q = \Sigma_{i=1}^{3} q_i$

When a crossing path is detected, as shown in FIG. 4, the collision warning system 12 proceeds to step S70 in which a warning is issued, or generated. When a crossing path is not detected in step S60, then the process moves to step S80.

In step S70, the collision warning system 12 causes a warning to be issued, or generated. The generated warning can be at least one of an audible warning, a visual warning, or a haptic warning.

When a crossing path is not detected in step S60, the process moves to step S80 in which a determination is made whether an active warning exists. When there is no active warning, the process end. When an active warning exists, the collision warning system 12 cancels the warning in step S90, and the process ends. An active warning can exist when a crossing path was previously detected. When the crossing path is no longer detected, then the active warning is canceled in step S90.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the collision warning system. Accordingly, these terms, as utilized to describe the present invention should be interpreted relative to a vehicle equipped with the collision warning system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A collision warning system for a host vehicle comprising:
    a wireless communication system configured to receive data transmissions from remote vehicles, each data transmission including an identification and current positional information of a transmitting remote vehicle; and
    an electronic controller configured to
        receive data transmissions from a first remote vehicle;
        determine a travel path traveled by the first remote vehicle based on positional information included in the received data transmissions from the first remote vehicle;
        determine whether the host vehicle is on the travel path traveled by the first remote vehicle;
        receive data transmissions from a second remote vehicle;
        determine whether the second remote vehicle is on the travel path traveled by the first remote vehicle upon determining that the host vehicle is on the travel path traveled by the first remote vehicle;
        prevent generation of a warning upon determining that the second remote vehicle is on the travel path of the first remote vehicle;
        determine whether the host vehicle and the second remote vehicle are on an intersecting path upon determining that the second remote vehicle is not on the travel path of the first remote vehicle; and
        generate a warning upon determining that the host vehicle and the second remote vehicle are on the intersecting path,
    each of the host vehicle, the first remote vehicle, and the second remote being a different vehicle.

2. The collision warning system according to claim 1, wherein
    the controller is configured to determine the travel path of the host vehicle upon receiving a predetermined number of data transmissions from the first remote vehicle.

3. The collision warning system according to claim 2, wherein
    the predetermined number of data transmissions is based on a steering wheel angle of the first remote vehicle, the predetermined number of data transmissions increasing with an increase in the steering wheel angle.

4. The collision warning system according to claim 1, wherein
    the controller is configured to determine whether the second remote vehicle is on the travel path after determining that the second remote vehicle is ahead of the host vehicle and that the second remote vehicle is moving toward the host vehicle.

5. The collision warning system according to claim 1, wherein
    the controller is further configured to determine the travel path of the host vehicle without using map data from a navigation system of the host vehicle.

6. A collision warning method for a host vehicle comprising:
    receiving a data transmission from a first remote vehicle, the data transmission of the first remote vehicle including an identification of the first remote vehicle and current positional information of the first remote vehicle;
    determining a travel path traveled by the first remote vehicle based on the received positional information from the first remote vehicle;
    determining whether the host vehicle is on the travel path traveled by the first remote vehicle;
    setting the travel path of the first remote vehicle as the travel path of the host vehicle upon determining the host vehicle to be on the travel path of the first remote vehicle;
    receiving a data transmission from a second remote vehicle, the data transmission of the second remote vehicle including an identification of the second remote vehicle and current positional information of the second remote vehicle;
    determining whether the second remote vehicle is on the travel path traveled by the first remote vehicle upon determining that the host vehicle is on the travel path traveled by the first remote vehicle;
    preventing generation of a warning upon determining that the second remote vehicle is on the travel path of the first remote vehicle;
    determining whether the host vehicle and the second remote vehicle are on an intersecting path; and
    generating the warning upon determining that the host vehicle and the second remote vehicle are on the intersecting path,
    each of the host vehicle, the first remote vehicle, and the second remote being a different vehicle.

7. The collision warning method according to claim 6, wherein
    the travel path of the host vehicle is determined upon receiving a predetermined number of data transmissions from the first remote vehicle.

8. The collision warning method according to claim 7, wherein
    the predetermined number of data transmissions is based on a steering wheel angle of the first remote vehicle, the predetermined number of data transmissions increasing with an increase in the steering wheel angle.

9. The collision warning method according to claim 6, wherein
determining that the second remote vehicle is ahead of the host vehicle and that the second remote vehicle is moving toward the host vehicle prior to determining whether the second remote vehicle is on the travel path of the host vehicle.

10. The collision warning method according to claim 7, wherein
the determining whether the host vehicle is on the travel path of the first remote vehicle includes
initiating a first count;
obtaining positional information of the first remote vehicle from the data transmission corresponding to a first count number and from the data transmission corresponding to the first count number increased by one; and
determining a first angle and a second angle between the first remote vehicle and the host vehicle based on the positional information from the two consecutively received data transmissions from the first remote vehicle.

11. The collision warning method according to claim 10, further comprising
increasing the first count number by one when at least one of the first angle and the second angle is greater than ninety degrees;
obtaining positional information of the first remote vehicle from the data transmission corresponding to the increased first count number and from the data transmission corresponding to the increased first count number increased by one;
determining the first angle and the second angle between the first remote vehicle and the host vehicle based on the positional information from the two consecutively received data transmissions from the first remote vehicle.

12. The collision warning method according to claim 10, further comprising
determining a distance between the host vehicle and a path defined by the positional information from the two consecutively received data transmissions from the first remote vehicle in a width direction of a lane.

13. The collision warning method according to claim 12, wherein
the host vehicle is determined to be on the travel path when the distance is less than a first predetermined distance.

14. The collision warning method according to claim 13, wherein
setting a second count number for the second remote vehicle;
obtaining the positional information of the second remote vehicle from the data transmission received from the second remote vehicle;
comparing the positional information received from the second remote vehicle to the positional information of the traveling path corresponding to the second count number and corresponding to the second count number decreased by one; and
determining the first angle and the second angle between the second remote vehicle and the host vehicle based on the positional information from the two consecutive data points of the travel path.

15. The collision warning method according to claim 14, further comprising
decreasing the second count number by one when at least one of the first angle and the second angle is greater than ninety degrees;
updating the positional information of the second remote vehicle from the data transmission received from the second remote vehicle;
comparing the updated positional information of the second remote vehicle to the positional information of the travel path corresponding to the decreased second count number and from the data transmission corresponding to the decreased second count number decreased by one; and
determining the first angle and the second angle between the second remote vehicle and the host vehicle based on the positional information from the two consecutive data points of the travel path.

16. The collision warning method according to claim 15, further comprising
determining a distance between the second remote vehicle and the path defined by the positional information from the two consecutively received data transmissions from the second remote vehicle in a width direction of a first lane.

17. The collision warning method according to claim 16, wherein
determining the second remote vehicle is on the travel path of the host vehicle when the distance is between a first predetermined distance and a second predetermined distance.

18. The collision warning method according to claim 17, wherein
the distance being between a first predetermined distance and a second predetermined distance indicates the second remote vehicle is in a second lane adjacent a first lane in which the host vehicle is traveling.

19. The collision warning method according to claim 17, wherein
the second count number is set as the predetermined number of data transmissions from the first remote vehicle.

20. A collision warning method for a host vehicle comprising:
receiving a data transmission from a first remote vehicle, the data transmission of the first remote vehicle including an identification of the first remote vehicle and current positional information of the first remote vehicle;
determining a travel path traveled by the first remote vehicle based on the received positional information from the first remote vehicle, the travel path of the first remote vehicle being determined without using map data from a navigation system of the host vehicle;
determining whether the host vehicle is on the travel path traveled by the first remote vehicle without using the map data from the navigation system of the host vehicle;
setting the travel path of the first remote vehicle as the travel path of the host vehicle upon determining the host vehicle to be on the travel path of the first remote vehicle;
receiving a data transmission from a second remote vehicle, the data transmission of the second remote vehicle including an identification of the second remote vehicle and current positional information of the second remote vehicle;

determining whether the second remote vehicle is on the travel path traveled by the first remote vehicle upon determining that the host vehicle is on the travel path traveled by the first remote vehicle;

preventing generation of a warning upon determining that the second remote vehicle is on the travel path of the first remote vehicle;

determining whether the host vehicle and the second remote vehicle are on an intersecting path; and generating the warning upon determining that the host vehicle and the second remote vehicle are on the intersecting path, each of the host vehicle, the first remote vehicle, and the second remote being a different vehicle, the determining whether the host vehicle is on the travel path of the first remote vehicle including
- initiating a first count;
- obtaining positional information of the first remote vehicle from the data transmission corresponding to a first count number and from the data transmission corresponding to the first count number increased by one; and
- determining a first angle and a second angle between the first remote vehicle and the host vehicle based on the positional information from the two consecutively received data transmissions from the first remote vehicle, the determining whether the second vehicle is on the travel path of the first remote vehicle including
- initiating a second count;
- obtaining positional information of the second remote vehicle from the data transmission received from the second remote vehicle,
- comparing the positional information received from the second remote vehicle to the positional information of the traveling path corresponding to the second count number and corresponding to the second count number decreased by one; and
- determining a first angle and a second angle between the second remote vehicle and the host vehicle based on the positional information from the two consecutive data points of the travel path.

* * * * *